US012003897B2

United States Patent
Yamamoto

(10) Patent No.: US 12,003,897 B2
(45) Date of Patent: Jun. 4, 2024

(54) PROJECTION DISPLAY APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/733,188

(22) Filed: Apr. 29, 2022

(65) Prior Publication Data
US 2022/0368868 A1 Nov. 17, 2022

(30) Foreign Application Priority Data

May 14, 2021 (JP) ................................. 2021-082661
May 14, 2021 (JP) ................................. 2021-082665

(51) Int. Cl.
H04N 9/31 (2006.01)
G02B 13/16 (2006.01)
G02B 19/00 (2006.01)
G02B 27/28 (2006.01)

(52) U.S. Cl.
CPC ............. H04N 9/317 (2013.01); G02B 13/16 (2013.01); G02B 19/0047 (2013.01); G02B 27/286 (2013.01)

(58) Field of Classification Search
CPC .... H04N 9/317; G02B 13/16; G02B 19/0047; G03B 27/286
USPC .......................................................... 353/82
See application file for complete search history.

(56) References Cited

U.S. PATENT DOCUMENTS

2008/0151129 A1  6/2008  Abe
2010/0201894 A1  8/2010  Nakayama et al.
2011/0249171 A1* 10/2011 Shigemitsu .......... G02B 13/004
                                                         348/340

(Continued)

FOREIGN PATENT DOCUMENTS

CN    208766403 U  *  4/2019  ............. G02B 27/22
JP    2002-6397         1/2002

(Continued)

OTHER PUBLICATIONS

Translation of CN 208766403 U (Year: 2023).*

Primary Examiner — Jerry L Brooks
(74) Attorney, Agent, or Firm — Wenderoth, Lind & Ponack, L.L.P.

(57) ABSTRACT

A projection display apparatus includes an image light emitter that includes a light modulation element that emits image light, a projection lens unit that projects the image light on a projection target, an optical path separation element, an imaging element that images external light incident via the projection lens unit and the optical path separation element, and a condensing optical system. The optical path separation element transmits a part of the image light to the projection lens unit, and reflects a part of the external light emitted from the projection lens unit to the condensing optical system. The condensing optical system condenses the part of the external light reflected by the optical path separation element on the imaging element. A capturing angle of the external light in the condensing optical system is equal to or less than a condensing angle of a lens F-number of the projection lens unit.

22 Claims, 22 Drawing Sheets

(56) References Cited

U.S. PATENT DOCUMENTS

| | | | |
|---|---|---|---|
| 2012/0320164 A1* | 12/2012 | Lipton | H04N 13/218 |
| | | | 348/E13.074 |
| 2017/0235433 A1 | 8/2017 | Kaneda | |
| 2018/0253188 A1 | 9/2018 | Kaneda | |
| 2020/0278594 A1 | 9/2020 | Inoue et al. | |

FOREIGN PATENT DOCUMENTS

| | | |
|---|---|---|
| JP | 2005-107364 | 4/2005 |
| JP | 2008-158182 | 7/2008 |
| JP | 2009-237063 | 10/2009 |
| JP | 2011-228765 | 11/2011 |
| JP | 2016-225748 | 12/2016 |
| JP | 2020-91342 | 6/2020 |
| JP | 2020-98224 | 6/2020 |
| JP | 2020-101651 | 7/2020 |
| JP | 2020-140115 | 9/2020 |
| WO | 2009/142015 | 11/2009 |
| WO | 2016/031447 | 3/2016 |
| WO | 2016/080114 | 5/2016 |

* cited by examiner

PROJECTION DISPLAY APPARATUS

BACKGROUND

1. Technical Field

The present disclosure relates to a projection display apparatus including an imaging element.

2. Description of the Related Art

In the related art, a projection display apparatus projects an image on a projection target such as a screen or a building. In order to check a positional relationship (distortion) between a projection target and a projected image, the image projected on the projection target may be imaged. A projection position is finely adjusted based on the imaged image.

When a projection display apparatus and an imaging element that images the projected image are separated from each other, since an angle of view adjustment is troublesome, there is a projection display apparatus in which an imaging element is built. The angle of view adjustment can be omitted by sharing an optical path of image light emitted from the projection display apparatus and an optical path for imaging light reflected from a projection surface.

For example, Unexamined Japanese Patent Publication No. 2020-91342 shares optical axes of an optical path of image light emitted from a projection display apparatus and an optical path for imaging light reflected from a projection surface by using an optical path branching element.

SUMMARY

However, in the technology described in Unexamined Japanese Patent Publication No. 2020-91342, the optical path branching element branches the image light incident on the imaging element by using a polarization separation coating, but there is a problem that stray light generated in the optical path branching element is incident on the imaging element.

An object of the present disclosure is to provide a projection display apparatus that reduces stray light entering an imaging element.

A projection display apparatus according to a first aspect of the present disclosure includes an image light emitter that includes a light modulation element that emits image light obtained by modulating light from a light source device according to an image signal, a projection lens unit that enlarges and projects the image light on a projection target, and incidents external light including the image light reflected by the projection target, an optical path separation element that is disposed between the image light emitter and the projection lens unit, an imaging element that images the external light incident via the projection lens unit and the optical path separation element, and a condensing optical system that is disposed between the optical path separation element and the imaging element. The optical path separation element transmits a part of the image light emitted from the image light emitter to the projection lens unit, and reflects a part of the external light emitted from the projection lens unit to the condensing optical system. The condensing optical system condenses the part of the external light reflected by the optical path separation element on the imaging element. A capturing angle of the external light in the condensing optical system is equal to or less than a condensing angle of a lens F-number of the projection lens unit.

A projection display apparatus according to a second aspect of the present disclosure includes an image light emitter that emits image light in a first polarization state of one of P-polarized light and S-polarized light, an optical path separation element including a polarization separation coating that transmits the image light in the first polarization state incident from the image light emitter, and reflects light in a second polarization state of the other of the P-polarized light and the S-polarized light, a projection lens unit that enlarges and projects the image light transmitted through the optical path separation element on a projection target, and incidents external light including the image light reflected on the projection target, a ¼ wave plate that is disposed between the optical path separation element and the projection lens unit, converts the image light in the first polarization state into circularly polarized image light, and converts the circularly polarized image light reflected by the projection target into image light in the second polarized state, an imaging element that images the external light incident via the projection lens unit and the optical path separation element, and a polarizing plate that is disposed between the optical path separation element and the imaging element, and transmits the external light in the second polarization state.

The present disclosure can provide a projection display apparatus that reduces stray light entering an imaging element.

DETAILED DESCRIPTIONS

Exemplary embodiments will be described in detail below with reference to the drawings as appropriate. However, unnecessarily detailed description may be omitted. For example, the detailed description of already well-known matters and the redundant description of configurations substantially identical to already-described configurations may be omitted. This is to avoid the following description from being unnecessarily redundant, and to help those skilled in the art easily understand the description.

Note that, the accompanying drawings and the following description are provided for those skilled in the art to fully understand the present disclosure, and are not intended to limit the subject matter described in the claims.

First Exemplary Embodiment

[1-1. Configuration of Projection Display Apparatus]

Figure 1:
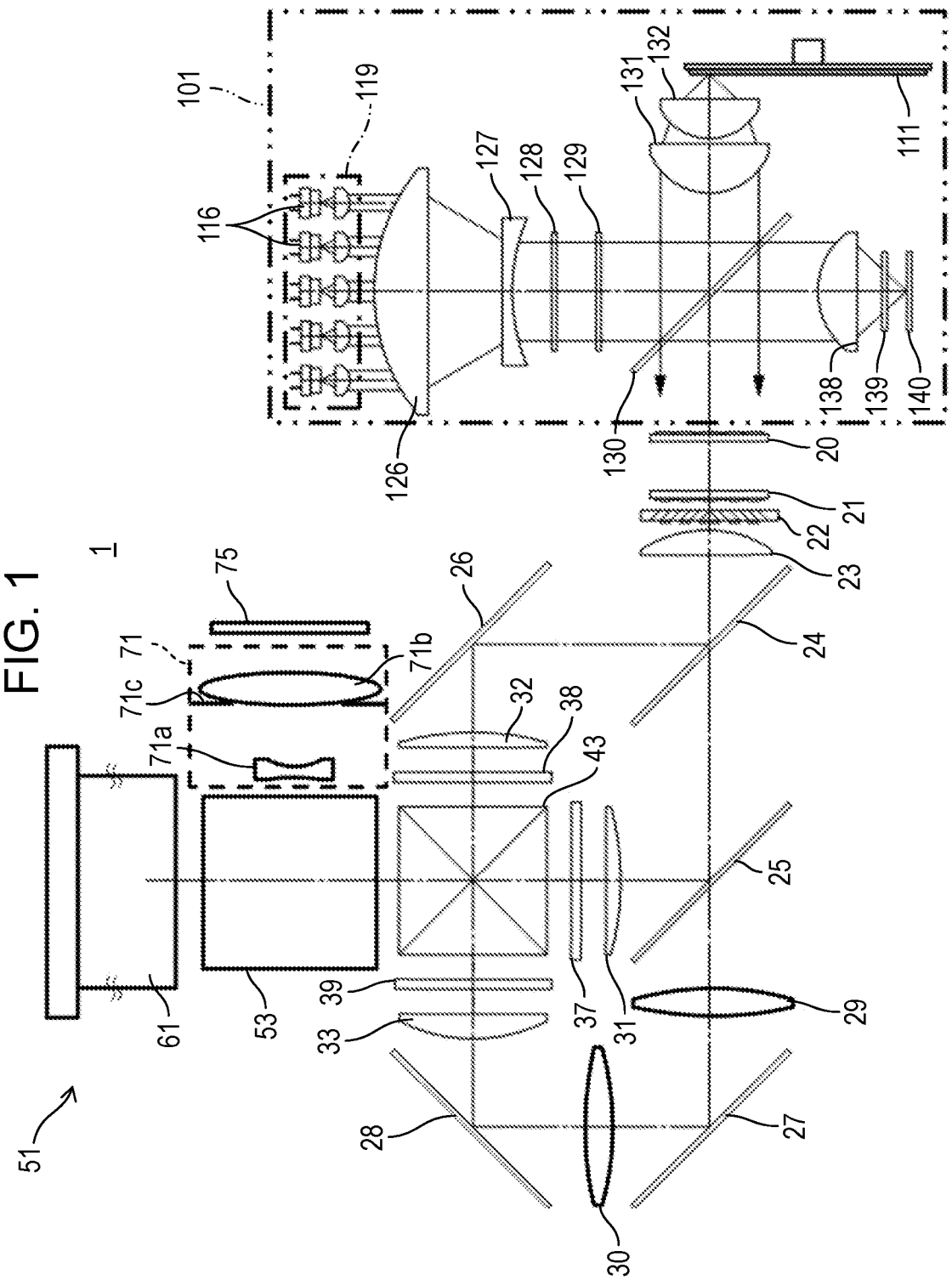
FIG. 1 is a diagram illustrating a configuration of a projection display apparatus according to a first exemplary embodiment.

Projection display apparatus 1 according to a first exemplary embodiment will be described with reference to FIG. 1. FIG. 1 is a configuration diagram of projection display apparatus 1 according to the first exemplary embodiment.

Projection display apparatus 1 uses, as an image forming part, a light modulation element that emits image light obtained by modulating light from a light source device according to an image signal. A transmissive panel type liquid crystal display element of an active matrix type in a twisted nematic (TN) mode or a vertical alignment (VA) mode, in which a thin film transistor is formed in a pixel region, is used as the light modulation element that forms the image.

Light source device 101 includes, for example, blue semiconductor laser 116, blue solid-state light source unit 119, lenses 126, 127, first diffuser plate 128, first retarder plate 129, dichroic mirror 130, condenser lenses 131, 132, 138, ¼ wave plate 139, diffusion reflector plate 140, and phosphor wheel 111.

Light emitted from light source device 101 is incident on projection lens unit 61 via an optical system including first lens array plate 20, second lens array plate 21, polarization conversion element 22, superimposing lens 23, red-reflecting dichroic mirror 24, green-reflecting dichroic mirror 25, reflection mirrors 26, 27, 28, relay lenses 29, 30, field lenses 31, 32, 33, liquid crystal display elements 37, 38, 39, and color combining prism 43 including a red-reflecting dichroic mirror and a blue-reflecting dichroic mirror. Color combining prism 43 is, for example, a cross-cube prism.

White light from light source device 101 is incident on first lens array plate 20 including a plurality of lens elements. A light flux incident on first lens array plate 20 is divided into a large number of light fluxes. The large number of divided light fluxes are converged on second lens array plate 21 including a plurality of lens elements. The lens elements of first lens array plate 20 have aperture shapes similar to shapes of liquid crystal display elements 37, 38, 39. Regarding the lens elements of second lens array plate 21, a focal length is determined such that first lens array plate 20 and liquid crystal display elements 37, 38, 39 are in an approximate conjugate relation. Light emitted from second lens array plate 21 is incident on polarization conversion element 22.

Polarization conversion element 22 includes a polarized light separation prism and a ½ wavelength plate, and converts natural light from light source device 101 into light in one polarization direction. Since fluorescent light is natural light, the natural light is polarized and converted in one polarization direction. For example, since blue light is incident as S-polarized light, the blue light is converted into P-polarized light. The light from polarization conversion element 22 is incident on superimposing lens 23. Superimposing lens 23 is a lens for superimposing and illuminating the light emitted from each of lens elements of second lens array plate 21 on liquid crystal display elements 37, 38, 39.

The light from superimposing lens 23 is separated into blue, green, and red color light rays by red-reflecting dichroic mirror 24 and green-reflecting dichroic mirror 25 which serve as a color separation part. The green light is transmitted through field lens 31 and is incident on liquid crystal display element 37. The red light is reflected by reflection mirror 26, then is transmitted through field lens 32, and is incident on liquid crystal display element 38. The blue light is transmitted through, is refracted by, and reflected by relay lenses 29, 30 and reflection mirrors 27, 28, is transmitted through field lens 33, and is incident on liquid crystal display element 39.

Three liquid crystal display elements 37, 38, 39 change a polarization state of incident light by controlling a voltage applied to pixels corresponding to the image signals, modulate light in cooperation with incidence-side polarizing plates and emission-side polarizing plates which are arranged on both sides of liquid crystal display elements 37, 38, 39 to be orthogonal to transmission axes, and form green, red, and blue images. Of the color light rays emitted from liquid crystal display elements 37, 38, 39, the red and blue color light rays are reflected by red-reflecting dichroic mirror and the blue-reflecting dichroic mirror, respectively, the green color light rays are combined by color combining prism 43, and the combined light is incident on projection imaging optical system 51.

[1-2. Configurations of Image Light Emitter and Imaging Element]

Figure 2:
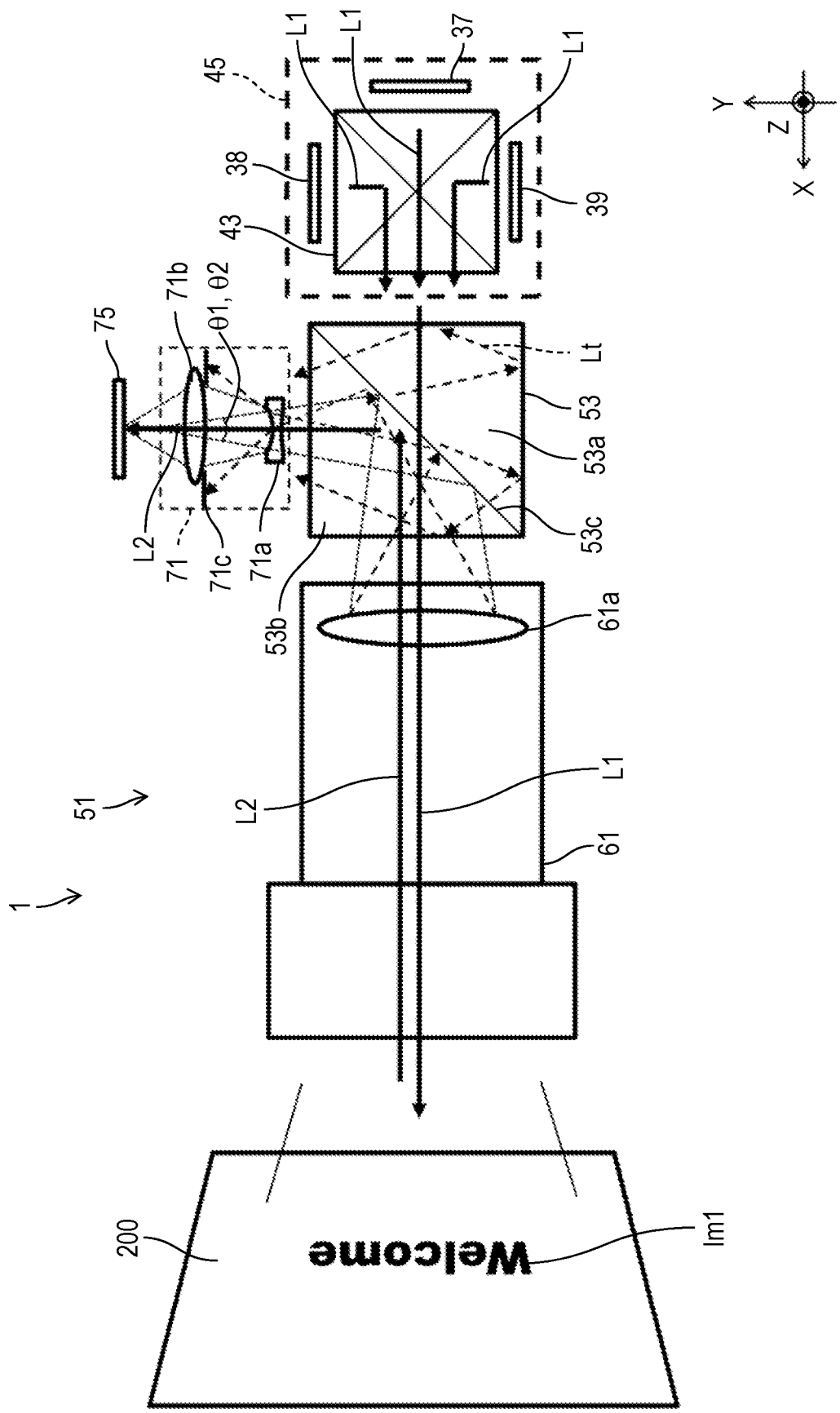
FIG. 2 is a diagram illustrating a configuration of a projection imaging optical system according to the first exemplary embodiment.

Next, projection imaging optical system 51 will be described with reference to FIG. 2. FIG. 2 is a diagram illustrating a configuration of projection imaging optical system 51 according to the first exemplary embodiment. Projection imaging optical system 51 includes optical path separation element 53, projection lens unit 61, condensing optical system 71, and imaging element 75. Image light emitter 45 includes liquid crystal display elements 37, 38, 39 and color combining prism 43.

Color combining prism 43, optical path separation element 53, and projection lens unit 61 are arranged in order along an optical axis of light emitted from color combining prism 43. Condensing optical system 71 and imaging element 75 are arranged in a direction perpendicular to the optical axis of the light emitted from color combining prism 43. In the first exemplary embodiment, the condensing optical system and the imaging element are arranged on a side of optical path separation element 53.

Projection lens unit 61 enlarges and projects image light L1 on screen 200 as a projection target, and external light L2 including image light L1 reflected by screen 200 is incident. Projection lens unit 61 includes a plurality of lenses, and FIG. 1 illustrates one lens 61a disposed on the optical path separation element side.

Optical path separation element 53 transmits a part of image light L1 emitted from image light emitter 45 to projection lens unit 61, and reflects a part of external light L2 emitted from projection lens unit 61 to condensing optical system 71. Optical path separation element 53 is disposed between image light emitter 45 and projection lens unit 61. Optical path separation element 53 is, for example, an optical path separation prism, and includes first prism 53a and second prism 53b. First prism 53a and second prism 53b are bonded to each other, and partial reflection coating 53c is disposed on a bonding surface between first prism 53a and second prism 53b.

Partial reflection coating 53c reflects a part of each of incident image light L1 and external light L2 and transmits the remaining light. The amount of light reflected by optical path separation element 53 is, for example, 10% or less of the amount of light incident on optical path separation element 53. Partial reflection coating 53c reflects, for example, 10% of the amount of incident light and transmits 90% of the amount of incident light.

Figure 3:
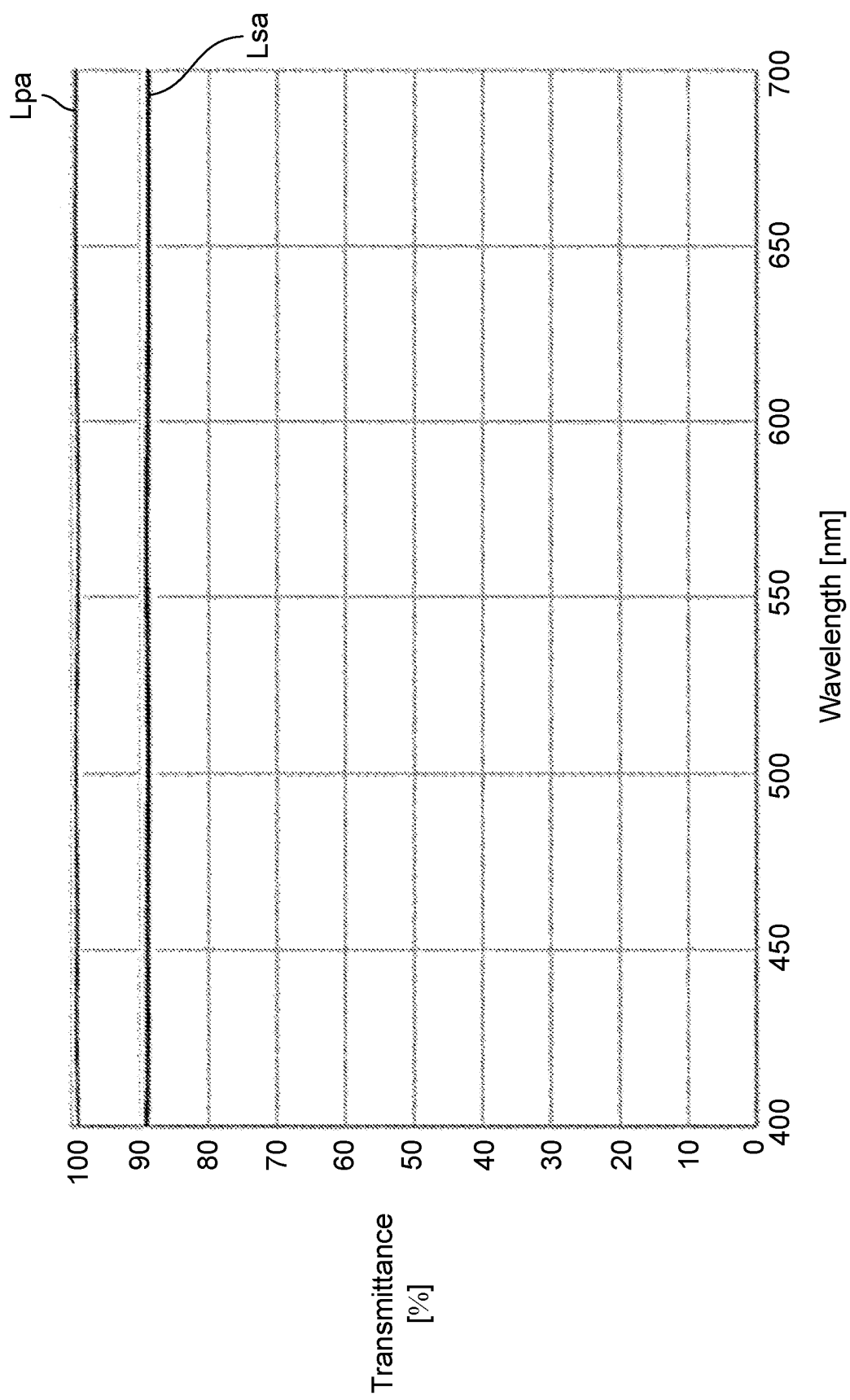
FIG. 3 is a graph representing characteristics of a partial reflection coating of an optical path separation element.

As illustrated in FIG. 3, for example, partial reflection coating 53c has properties that a transmittance of S-polarized light Lsa incident on partial reflection coating 53c at 45 degrees is about 89% and a transmittance of P-polarized light Lpa is 99%. In the case of such partial reflection coating 53c, an average of 94% of the amount of image light L1 emitted from image light emitter 45 is transmitted toward projection lens unit 61, and the remaining light of about 6% is reflected to a side opposite to imaging element 75. Conversely, about 6% of external light L2 incident from projection lens unit 61 is reflected toward imaging element 75.

Image light L1 emitted from image light emitter 45 and transmitted through optical path separation element 53 is enlarged by projection lens unit 61 and is projected on screen 200, and image Im1 is projected on screen 200. Image light L1 constituting image Im1 on screen 200 is reflected by screen 200, is included in external light L2, is incident on projection lens unit 61, and travels toward optical path separation element 53.

External light L2 incident on optical path separation element 53 is reflected by partial reflection coating 53c, a traveling direction thereof is changed by 90 degrees, and the external light is incident on condensing optical system 71.

Condensing optical system 71 condenses external light L2 reflected by optical path separation element 53 on imaging element 75. Condensing optical system 71 is disposed between optical path separation element 53 and imaging element 75. Condensing optical system 71 includes, for example, concave lens 71a that diverges incident external light L2, convex lens 71b that condenses external light L2 diverged by concave lens 71a on imaging element 75, and first light absorber 71c that is disposed between concave lens 71a and convex lens 71b and absorbs external light L2 diverged at a predetermined angle or more by concave lens 71a. In condensing optical system 71, concave lens 71a is disposed close to optical path separation element 53, and convex lens 71b is disposed close to imaging element 75. Note that, condensing optical system 71 may include a lens that alleviates aberration in addition to concave lens 71a and convex lens 71b. First light absorber 71c includes an optical diaphragm provided in condensing optical system 71, an aperture diaphragm of convex lens 71b, and the like. First light absorber 71c is, for example, a metal plate hollowed out in a circular shape or a black-coated glass plate.

Capturing angle $\theta1$ of external light L2 in condensing optical system 71 is equal to or less than condensing angle $\theta2$ of a lens F-number of projection lens unit 61. For example, when the F-number of projection lens unit 61 is F2.4, capturing angle $\theta1$ emitted from lens 61a is about ±12 degrees about the optical axis. Note that, FIG. 2 illustrates a case where capturing angle $\theta1$ is equal to condensing angle $\theta2$.

Imaging element 75 images external light L2 including image Im1 incident via projection lens unit 61, optical path separation element 53, and condensing optical system 71. Imaging element 75 is, for example, a complementary metal oxide semiconductor (CMOS) sensor or a charge-coupled device (CCD) sensor.

[1-3. Effects and the Like]

As described above, in the first exemplary embodiment, projection display apparatus 1 includes image light emitter 45 including liquid crystal display elements 37, 38, 39 that emit image light L1 obtained by modulating light from light source device 101 according to the image signals, and projection lens unit 61 that enlarges and projects image light L1 on screen 200 and on which external light L2 including image light L1 reflected by screen 200 is incident. Projection display apparatus 1 includes optical path separation element 53 disposed between image light emitter 45 and projection lens unit 61, imaging element 75 that images external light L2 incident via projection lens unit 61 and optical path separation element 53, and condensing optical system 71 disposed between optical path separation element 53 and imaging element 75. Optical path separation element 53 transmits a part of image light L1 emitted from image light emitter 45 to projection lens unit 61, and reflects a part of external light L2 emitted from projection lens unit 61 to condensing optical system 71. Condensing optical system 71 condenses external light L2 reflected by optical path separation element 53 on imaging element 75, and capturing angle $\theta1$ of external light L2 in condensing optical system 71 is equal to or less than condensing angle $\theta2$ of the lens F-number of projection lens unit 61.

Even though image light L1 and external light L2 are reflected in optical path separation element 53 and projection lens unit 61 to generate stray light Lt, since capturing angle $\theta1$ of external light L2 in condensing optical system 71 is equal to or less than condensing angle $\theta2$ of the lens F-number of projection lens unit 61, stray light Lt incident on condensing optical system 71 at an angle larger than capturing angle $\theta1$ can be attenuated. Thus, stray light incident on imaging element 75 can be reduced. In particular, since stray light Lt is repeatedly reflected within optical path separation element 53, an angle distribution tends to be widened, and thus, stray light Lt incident on condensing optical system 71 at an angle larger than capturing angle θ1 can be blocked and attenuated.

Figure 4:
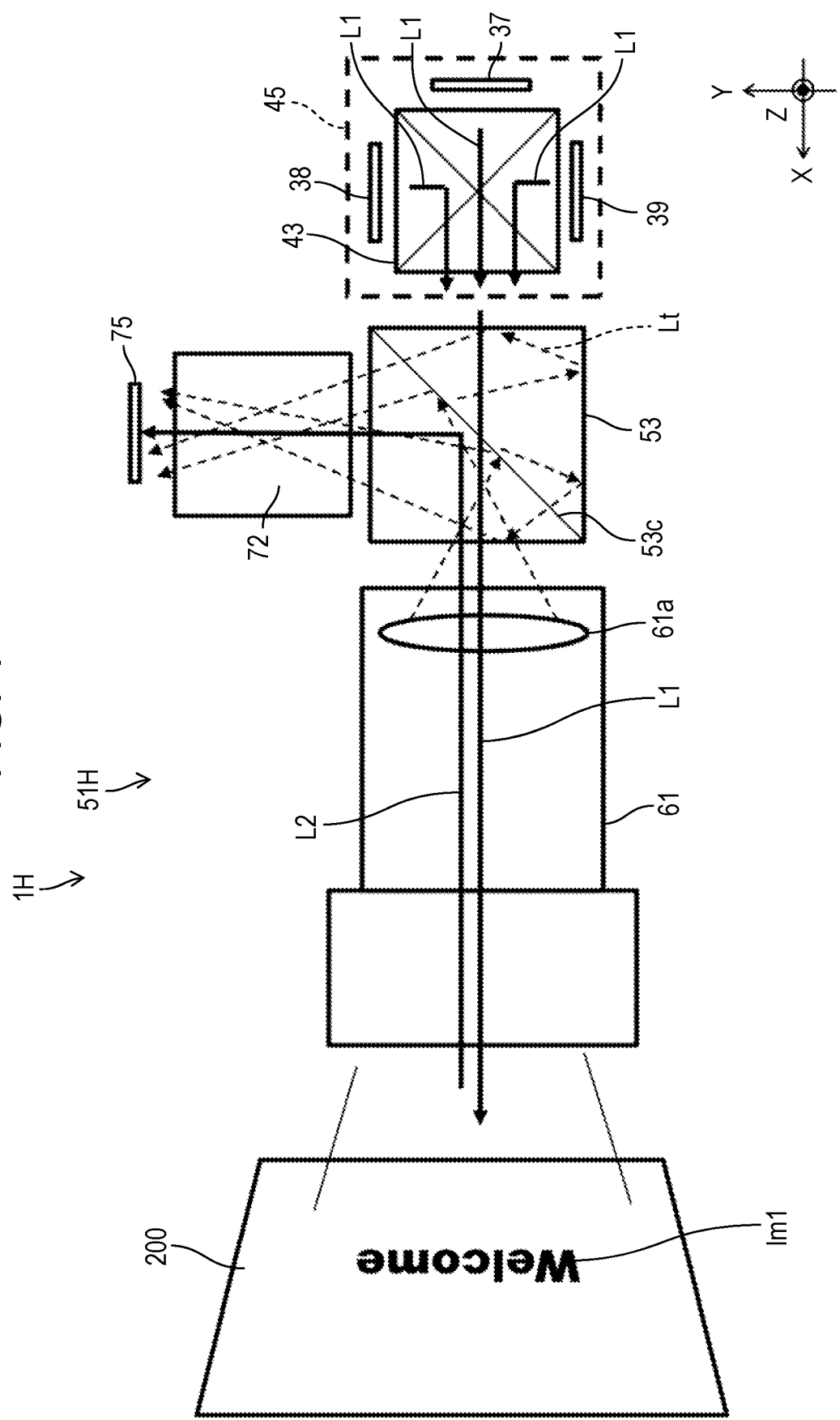
FIG. 4 is an explanatory diagram illustrating an optical path of a projection imaging optical system of a comparative example.

Here, the reduction of stray light Lt will be further described with reference to FIG. 4. FIG. 4 is an explanatory diagram illustrating an optical path of projection imaging optical system 51H of projection display apparatus 1H according to a comparative example.

As illustrated in FIG. 4, projection imaging optical system 51H includes prism spacer 72 for aligning a back focus of imaging element 75 instead of condensing optical system 71 of projection imaging optical system 51 of the present exemplary embodiment.

In the case of a configuration in which an optical path length from screen 200 to liquid crystal display elements 37, 38, 39 is equal to an optical path length from screen 200 to imaging element 75 by optical path separation element 53 and prism spacer 72, stray light Lt derived from image light L1 generated in optical path separation element 53 and projection lens unit 61 is incident on imaging element 75 at any angle. In particular, when external light L2 becomes dark at night, an S/N ratio decreases, and external light L2 cannot be appropriately imaged.

On the other hand, in projection imaging optical system 51 of the present exemplary embodiment, as illustrated in FIG. 2, since condensing optical system 71 is disposed between optical path separation element 53 and imaging element 75, the incidence of stray light Lt emitted from optical path separation element 53 toward imaging element 75 on imaging element 75 can be reduced. Thus, since the noise of stray light Lt can be reduced, image Im1 with an improved S/N ratio can be imaged.

In projection imaging optical system 51 of the present exemplary embodiment, a first optical path length between screen 200 and liquid crystal display elements 37, 38 39 via projection lens unit 61 and optical path separation element 53 is different from a second optical path length between screen 200 and imaging element 75 via condensing optical system 71. As a result, the incidence of stray light Lt emitted from optical path separation element 53 toward imaging element 75 on imaging element 75 can be reduced.

Second Exemplary Embodiment

Figure 5:
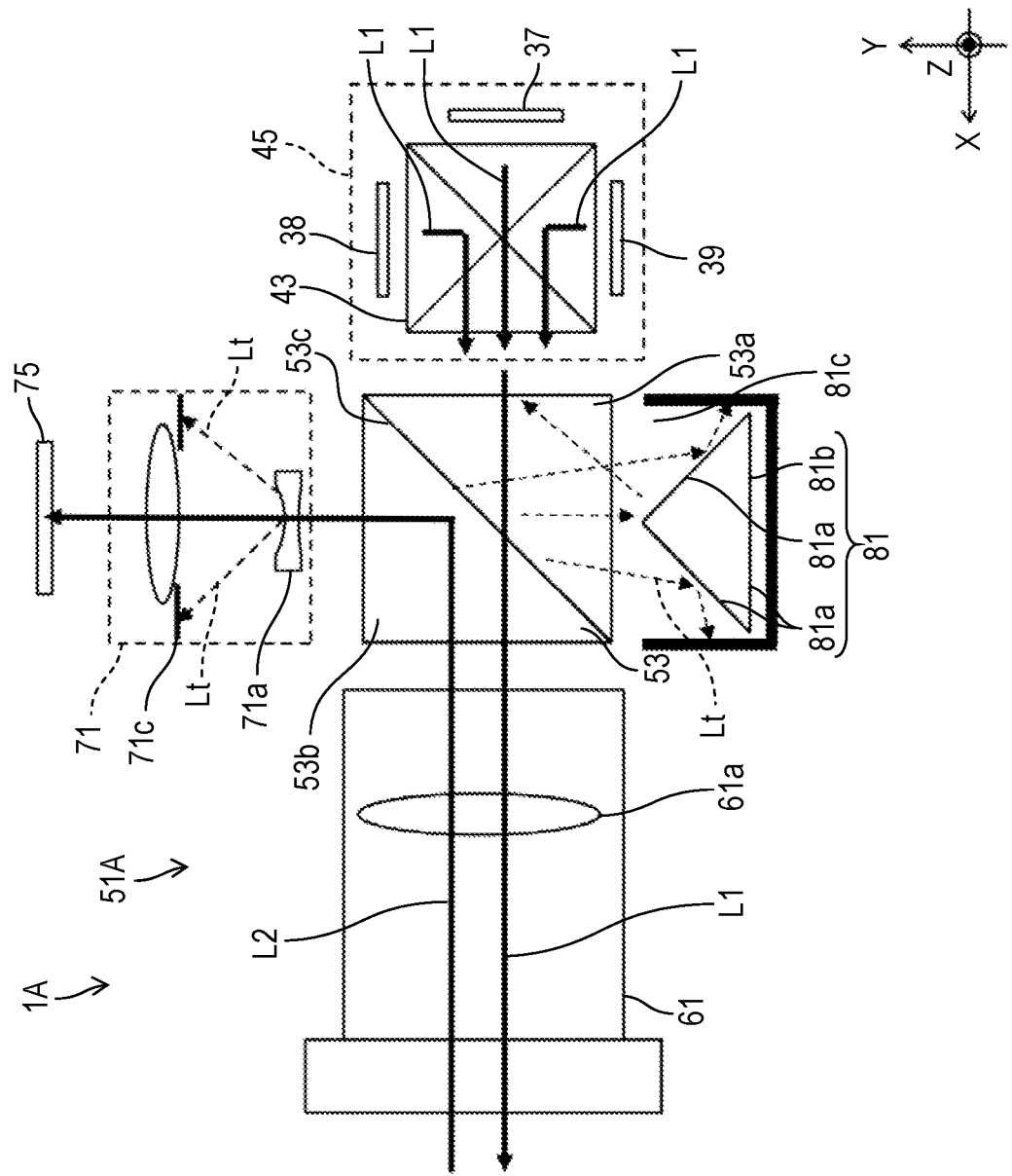
FIG. 5 is a diagram illustrating a configuration of a projection imaging optical system according to a second exemplary embodiment.

Next, projection imaging optical system 51A and projection display apparatus 1A according to a second exemplary embodiment will be described with reference to FIG. 5. FIG. 5 is a diagram illustrating a configuration of projection imaging optical system 51A according to the second exemplary embodiment.

Projection imaging optical system 51A according to the second exemplary embodiment is different from projection imaging optical system 51 according to the first exemplary embodiment in that reflected light attenuator 81 is provided as illustrated in FIG. 5. Projection display apparatus 1 according to the first exemplary embodiment and projection display apparatus 1A according to the second exemplary embodiment have common configurations other than this point and the points to be described below, and thus, the description thereof will be omitted.

Reflected light attenuator 81 is disposed on a side opposite to imaging element 75 with respect to optical path separation element 53, and is disposed on a side of optical path separation element 53 in FIG. 5. Thus, optical path separation element 53 is disposed between reflected light attenuator 81 and condensing optical system 71.

Reflected light attenuator 81 attenuates stray light Lt emitted from optical path separation element 53 toward reflected light attenuator 81. Reflected light attenuator 81 includes reflected light attenuation plate 81a and reflected light absorber 81b.

Reflected light attenuation plate 81a prevents stray light Lt incident from optical path separation element 53 from being reflected and directed to optical path separation element 53. Reflected light attenuation plate 81a is disposed to be inclined with respect to optical path separation element 53. A plurality of reflected light attenuation plates 81a may be arranged in a triangular shape.

Reflected light absorber 81b absorbs stray light Lt reflected by reflected light attenuation plate 81a. Reflected light absorber 81b is, for example, a container that accommodates reflected light attenuation plate 81a, and has opening 81c on the optical path separation element side.

Projection imaging optical system 51A and projection display apparatus 1A according to the second exemplary embodiment include reflected light attenuator 81 that attenuates at least a part of image light L1 reflected by optical path separation element 53. It is possible to prevent stray light Lt which is originally image light L1 from being emitted from optical path separation element 53, being reflected by an external structure of optical path separation element 53, being incident on optical path separation element 53 again, and being directed to imaging element 75, and it is possible to improve the S/N ratio of the light incident on imaging element 75.

Reflected light attenuator 81 includes reflected light attenuation plate 81a that is disposed on the side opposite to imaging element 75 with respect to optical path separation element 53 and is disposed to be inclined with respect to optical path separation element 53, and reflected light absorber 81b that absorbs the image light reflected by reflected light attenuation plate 81a. Since reflected light attenuation plate 81a is disposed to be inclined with respect to optical path separation element 53, when stray light Lt which is originally image light L1 is reflected by reflected light attenuation plate 81a, the amount of light traveling in a direction different from optical path separation element 53 increases. Since reflected light absorber 81b absorbs stray light Lt reflected by reflected light attenuation plate 81a, it is possible to prevent stray light Lt from traveling toward imaging element 75 again.

Third Exemplary Embodiment

Figure 6:
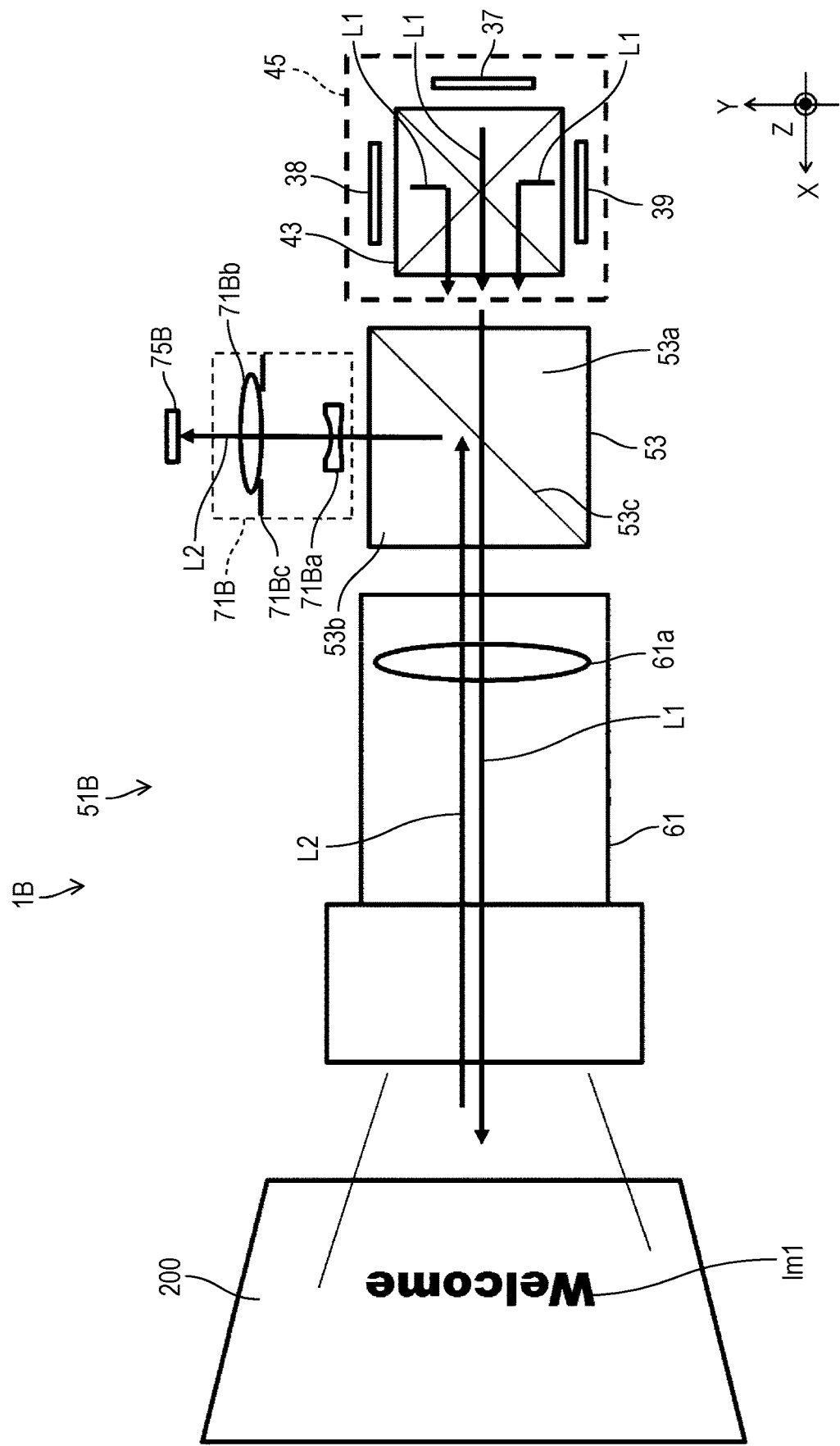
FIG. 6 is a diagram illustrating a configuration of a projection imaging optical system according to a third exemplary embodiment.

Next, projection imaging optical system 51B and projection display apparatus 1B according to a third exemplary embodiment will be described with reference to FIG. 6. FIG. 6 is a diagram illustrating a configuration of projection imaging optical system 51B according to the third exemplary embodiment.

Projection imaging optical system 51B according to the third exemplary embodiment is different from condensing optical system 71 of projection imaging optical system 51 according to the first exemplary embodiment in that condensing optical system 71B is a reduction optical system as illustrated in FIG. 6. Condensing optical system 71B includes, for example, concave lens 71Ba that diverges incident external light L2, convex lens 71Bb that condenses external light L2 diffused by concave lens 71Ba on imaging element 75B, and first light absorber 71Bc that is disposed between concave lens 71Ba and convex lens 71Bb and absorbs external light L2 diverged at a predetermined angle or more by concave lens 71Ba. Projection display apparatus 1 according to the first exemplary embodiment and projection display apparatus 1B according to the third exemplary embodiment have common configurations other than this point and the points to be described below, and thus, the description thereof will be omitted.

Condensing optical system 71B of projection imaging optical system 51B according to the third exemplary embodiment is a reduction optical system. Thus, since a lateral magnification when an image is formed on imaging element 75B via projection imaging optical system 51B and condensing optical system 71B is smaller than a lateral magnification when an image is formed on liquid crystal display elements 37, 38, 39 by projection imaging optical system 51B, when an identical image is captured, a size of imaging element 75B can be smaller than sizes of liquid crystal display elements 37, 38, 39. As a result, the entire projection display apparatus can be reduced in size and cost. In particular, in the case of a high-luminance projection display apparatus, since liquid crystal display elements 37, 38, 39 tend to be increased in size, when condensing optical system 71B that is the reduction optical system is used in such a projection display apparatus, it is possible to obtain advantages of further reduction in size and cost.

In accordance with projection imaging optical system 51B and projection display apparatus 1B according to the third exemplary embodiment, condensing optical system 71B includes the reduction optical system, liquid crystal display elements 37, 38, 39 and imaging element 75B are in a non-conjugate relationship with respect to projection lens unit 61, and the sizes of liquid crystal display elements 37, 38, 39 and the size of imaging element 75B are different. As a result, imaging element 75B can be smaller than liquid crystal display elements 37, 38, 39, and projection display apparatus 1B can be reduced in size and cost.

Fourth Exemplary Embodiment

Figure 7:
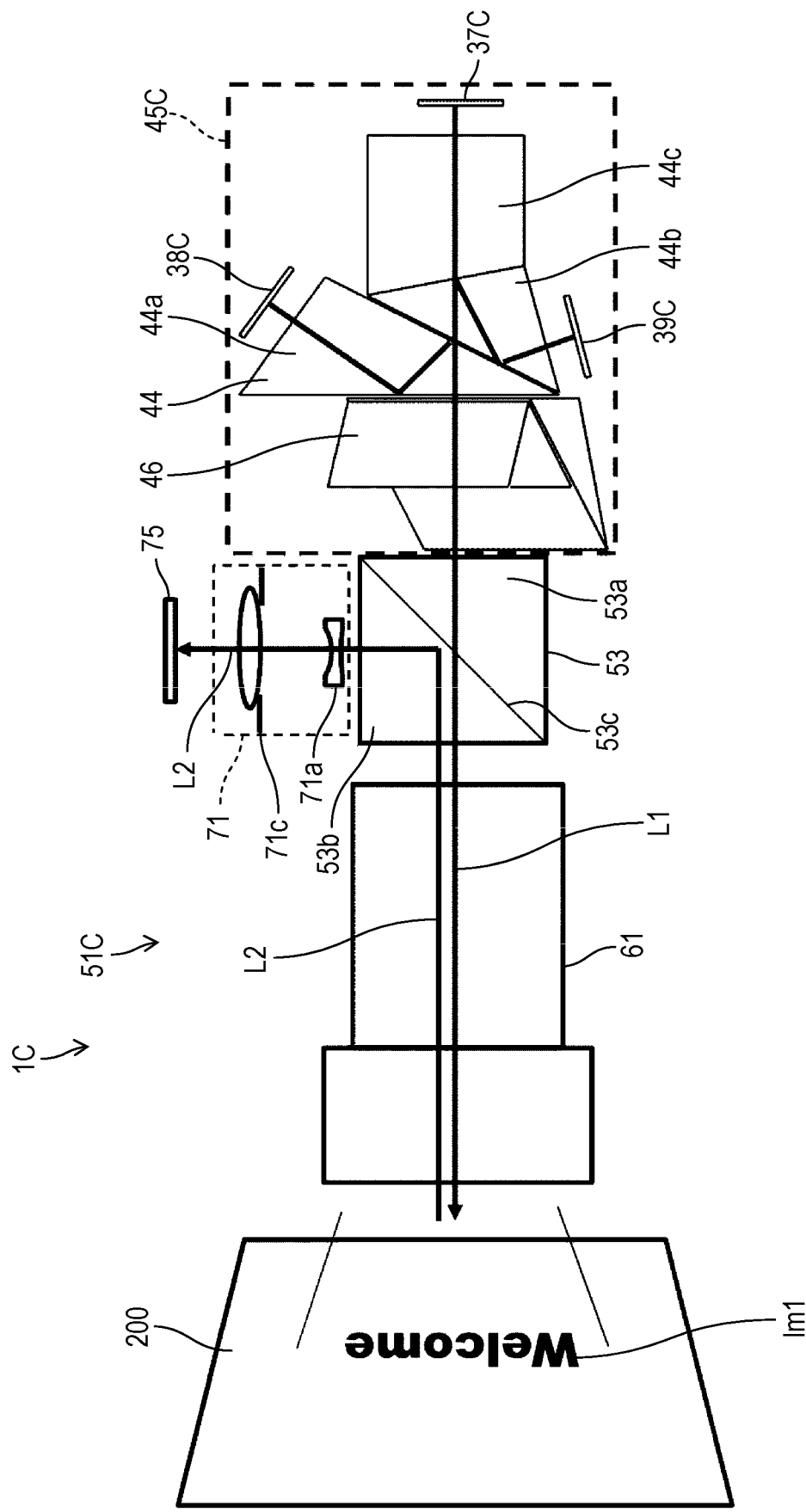
FIG. 7 is a diagram illustrating a configuration of a projection imaging optical system according to a fourth exemplary embodiment.

Next, projection imaging optical system 51C and projection display apparatus 1C according to a fourth exemplary embodiment will be described with reference to FIG. 7. FIG. 7 is a diagram illustrating a configuration of projection imaging optical system 51C according to the fourth exemplary embodiment.

As illustrated in FIG. 7, projection display apparatus 1C according to the fourth exemplary embodiment is different from projection display apparatus 1 according to the first exemplary embodiment in that image light emitter 45C includes a digital micromirror device (DMD) instead of the liquid crystal display element. Projection display apparatus 1 according to the first exemplary embodiment and projection display apparatus 1C according to the fourth exemplary embodiment have common configurations other than this point and the points to be described below, and thus, the description thereof will be omitted.

Image light emitter 45C according to the fourth exemplary embodiment includes DMDs 37C, 38C, 39C as light modulation elements, and projection display apparatus 1C and image light emitter 45C include color separating and combining prism 44 instead of red-reflecting dichroic mirror 24, green-reflecting dichroic mirror 25, and color combining prism 43 in the first exemplary embodiment. Projection display apparatus 1C and image light emitter 45C include total reflection prism 46.

Projection display apparatus 1C includes a rod integrator and a relay optical system (not illustrated) instead of first lens array plate 20, second lens array plate 21, polarization conversion element 22, and superimposing lens 23 in projection display apparatus 1 according to the first exemplary embodiment, and light emitted from light source device 101 is emitted as white light uniformized by the rod integrator.

The light emitted from the rod integrator is incident on total reflection prism 46 with a minute gap via a relay lens system (not illustrated). The light incident on total reflection prism 46 at an angle equal to or greater than a total reflection angle is reflected by the minute gap, is changed in a traveling direction, and is incident on color separating and combining prism 44 formed from three blocks with the minute gap.

Blue light of light incident on first block 44a of color separating and combining prism 44 from total reflection prism 46 is first reflected by a spectral characteristic reflection coating having characteristics of reflecting blue light, is changed in a traveling direction, travels to total reflection prism 46, is incident by the minute gap provided between total reflection prism 46 and color separating and combining prism 44 at an angle equal to or greater than the total reflection angle, and is incident on DMD 38C that displays a blue image.

Subsequently, red light of the light incident on color separating and combining prism 44 is reflected by a spectral characteristic reflection coating that is provided between second block 44b and third block 44c of color separating and combining prism 44, reflects light having a wavelength range of red color, and has spectral characteristics passing through green light, and is changed in a traveling direction toward first block 44a.

The red light changed in the traveling direction is reflected again by the minute gap provided between first block 44a and second block 44b of color separating and combining prism 44, is changed in a traveling direction, and is incident on DMD 39C for red color.

Green light of the light incident on color separating and combining prism 44 passes through a spectral characteristic reflection coating that is disposed between second block 44b and third block 44c of color separating and combining prism 44, reflects light having a wavelength range of red color, and has spectral characteristics passing through green light, travels to third block 44c as it is, and is incident on DMD 37C for green color.

DMDs 37C, 38C, 39C change the traveling direction of light by changing a direction of a mirror for each pixel according to an image signal of each color from a controller (not illustrated).

The green light changed in the traveling direction according to the image signal by DMD 37C for green color is incident on third block 44c of color separating and combining prism 44, and passes through a spectral characteristic reflection coating provided between third block 44c and second block 44b of color separating and combining prism 44.

The red light changed in the traveling direction according to the image signal by DMD 39C for red color is incident on second block 44b of color separating and combining prism 44, and is reflected by being incident on a minute gap provided between second block 44b and first block 44a of color separating and combining prism 44 at an angle equal to or greater than a total reflection angle. Thereafter, the red light is changed in a traveling direction to third block 44c of color separating and combining prism 44, is reflected by a spectral characteristic reflection coating that is provided between second block 44b and third block 44c of color separating and combining prism 44, is changed in a traveling direction, and is combined with green light.

The light combined by the spectral characteristic reflection coating travels toward first block 44a of color separating and combining prism 44, and is transmitted by being incident on a minute gap provided between second block 44b and first block 44a of color separating and combining prism 44 at an angle equal to or less than a total reflection angle.

The blue light changed in the travel direction according to the image signal in DMD 38C for blue color is incident on first block 44a of color separating and combining prism 44, travels to total reflection prism 46, and travels toward second block 44b of color separating and combining prism 44 by being incident on a gap between total reflection prism 46 and color separating and combining prism 44 at an angle equal to or greater than a total reflection angle. Thereafter, the blue light is reflected by a spectral characteristic reflection coating provided near first block 44a before a minute gap provided between first block 44a and second block 44b of color separating and combining prism 44, is changed in a traveling direction toward total reflection prism 46, is combined with the light from DMD 37C for green color and DMD 39C for red color, and is incident on total reflection prism 46.

Image light L1 from DMDs 37C, 38C, 39C incident on total reflection prism 46 is transmitted through total reflection prism 46, and is incident on optical path separation element 53. Condensing optical system 71 is designed such that external light L2 can form an image on imaging element 75 according to optical path lengths of total reflection prism 46 and color separating and combining prism 44.

In accordance with projection imaging optical system 51C and projection display apparatus 1C according to the fourth exemplary embodiment, even though the light modulation element is the DMD, the stray light incident on imaging element 75 can be reduced similarly to the liquid crystal display element. Note that, image light emitter 45C includes three DMDs 37C, 38C, 39C, but may include only one DMD.

Fifth Exemplary Embodiment

Figure 8:
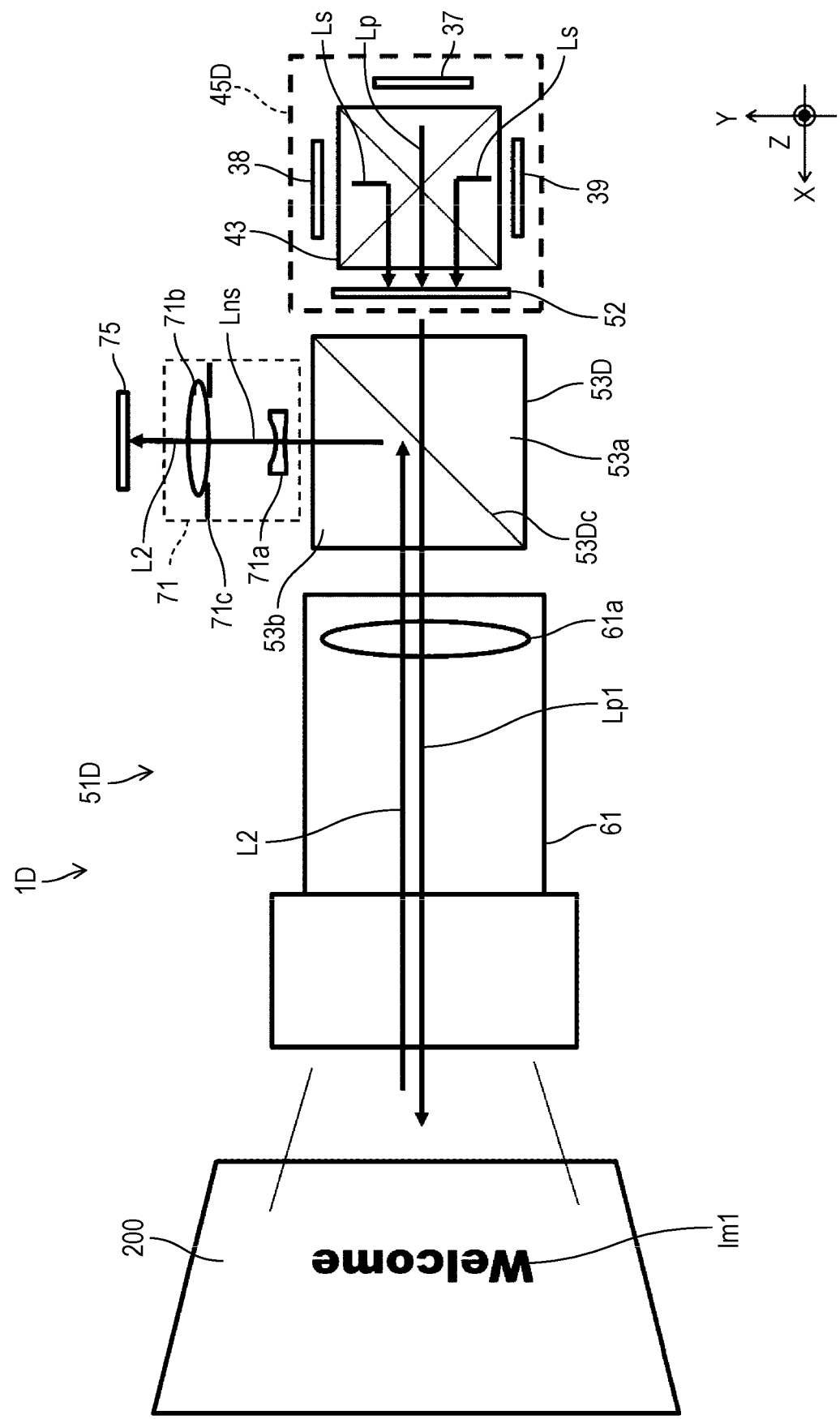
FIG. 8 is a diagram illustrating a configuration of a projection imaging optical system according to a fifth exemplary embodiment.

Next, projection imaging optical system 51D and projection display apparatus 1D according to a fifth exemplary embodiment will be described with reference to FIG. 8. FIG. 8 is a diagram illustrating a configuration of projection imaging optical system 51D according to the fifth exemplary embodiment.

Projection display apparatus 1D according to the fifth exemplary embodiment is different from the projection display apparatus according to the first exemplary embodiment in that image light emitter 45D includes narrowband retarder plate 52 as illustrated in FIG. 8. Projection display apparatus 1 according to the first exemplary embodiment and projection display apparatus 1D according to the fifth exemplary embodiment have common configurations other than this point and the points to be described below, and thus, the description thereof will be omitted. In the present exemplary embodiment, S-polarized light is polarized light having a vibration surface perpendicular to the paper surface of the drawing, and P-polarized light is polarized light having a vibration surface parallel to the paper surface of the drawing.

Narrowband retarder plate 52 aligns polarization states of image light rays emitted from liquid crystal display elements 37, 38, 39 and emits the aligned image light rays to optical path separation element 53D. In the fifth exemplary embodiment, as an example, P-polarized image light ray Lp is emitted from liquid crystal display element 37, and S-polarized image light rays Ls are emitted from liquid crystal display elements 38, 39. However, narrowband retarder plate 52 converts incident S-polarized image light rays Ls into P-polarized image light Lp1 and emits P-polarized image light Lp1, and incident P-polarized image light Lp is emitted as P-polarized image light Lp1 as it is. Narrowband retarder plate 52 is disposed between color combining prism 43 and optical path separation element 53D.

In the fifth exemplary embodiment, narrowband retarder plate 52 aligns incident S-polarized and P-polarized image light rays with the P-polarized light and emits the aligned image light rays, but may align the image light rays with the S-polarized light, and may emit the align image light rays. Thus, image light emitter 45D emits image light in a first polarization state of one of the P-polarized light and the S-polarized light.

Partial reflection coating 53Dc of optical path separation element 53D is a polarization separation coating, transmits incident P-polarized image light Lp1, reflects S-polarized component Lns of the incident external light, and bends a traveling direction by 90 degrees. Thus, image light Lp1 incident from narrowband retarder plate 52 is transmitted through optical path separation element 53D and is emitted toward projection lens unit 61. The polarization separation coating is, for example, a polarization beam splitter.

Figure 9:
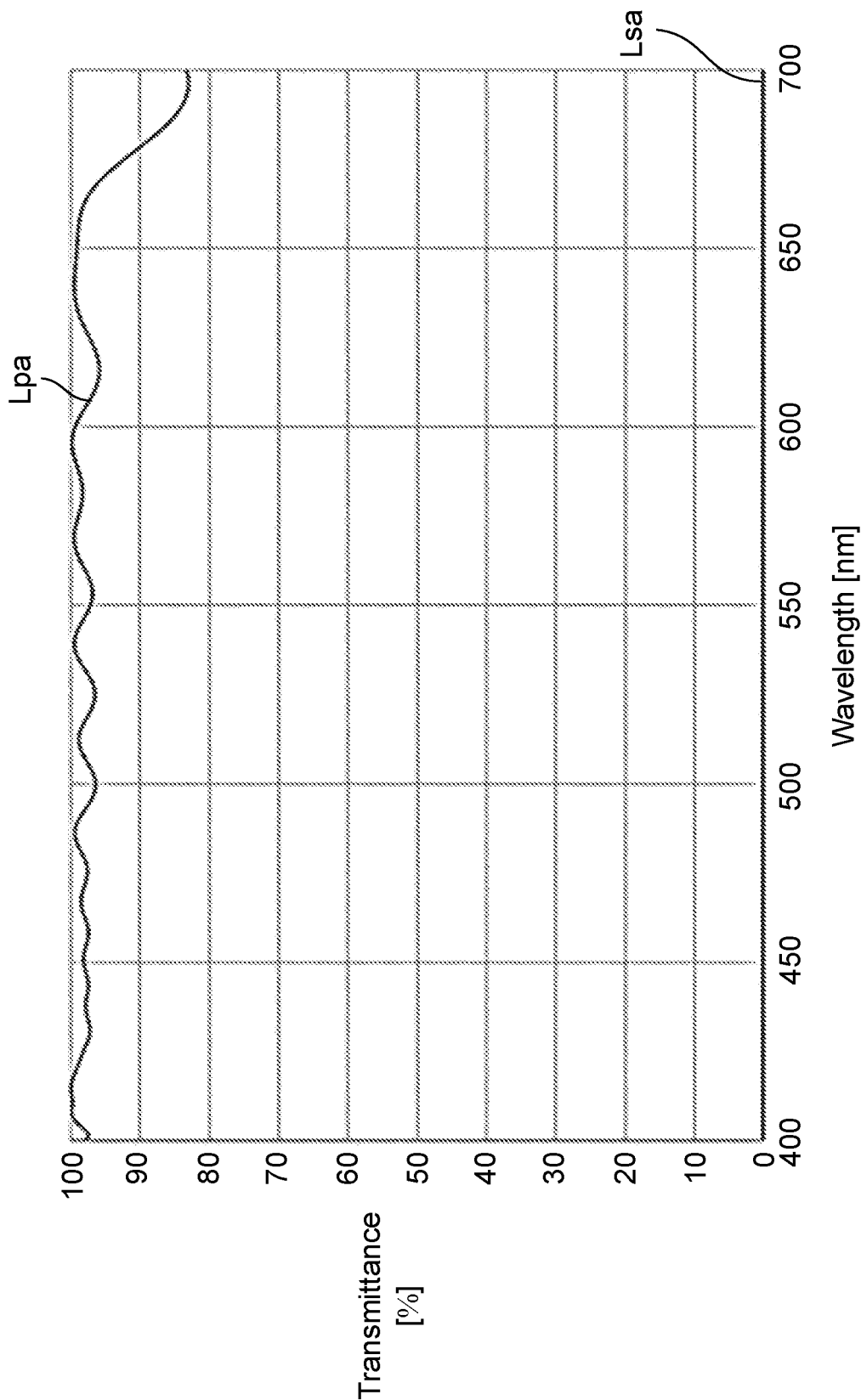
FIG. 9 is a graph representing characteristics of a partial reflection coating of an optical path separation element.

Characteristics of partial reflection coating 53Dc of optical path separation element 53D according to the fifth exemplary embodiment will be described with reference to FIG. 9. FIG. 9 is a graph representing transmittances of the P-polarized light and the S-polarized light of partial reflection coating 53Dc of optical path separation element 53D according to the fifth exemplary embodiment.

For example, partial reflection coating 53Dc has characteristics that the transmittance of S-polarized light Lsa incident on partial reflection coating 53Dc at 45 degrees is about 0% and the transmittance of P-polarized light Lpa is about 97%. The image light from color combining prism 43 is aligned with the P-polarized light by using narrowband retarder plate 52, and thus, about 97% of the image light travels toward screen 200, and about 3% of the image light is reflected to a side of optical path separation element 53 on a side opposite to condensing optical system 71.

On the other hand, all the S-polarized components of external light L2 incident from projection lens unit 61 are reflected toward imaging element 75 and are captured. When external light L2 is unpolarized light, 50% of external light L2 is reflected toward imaging element 75 and is captured. When polarization characteristics are used as projection light and the liquid crystal display elements are used as the light modulation elements, the use efficiency of the projection light is higher when partial reflection coating 53Dc is the polarization separation coating.

Image light Lp1 constituting image Im1 on screen 200 is reflected by screen 200 and is incident, as a part of external light L2, on optical path separation element 53 via projection lens unit 61. Since image light Lp1 is P-polarized light, the image light is transmitted through partial reflection coating 53Dc without being reflected. The S-polarized component of external light L2 is reflected by partial reflection coating 53Dc, is changed in a traveling direction by 90 degrees, and is incident on imaging element 75 via condensing optical system 71. Thus, imaging element 75 can image an image of screen 200 on which image Im1 is not displayed.

In accordance with projection imaging optical system 51D and projection display apparatus 1D according to the fifth exemplary embodiment, it is possible to reduce the incidence of stray light Lt generated in projection lens unit 61 and optical path separation element 53D on imaging element 75 by condensing optical system 71 even in the configuration in which optical path separation element 53D transmits and reflects light by using the polarization characteristics of light.

Sixth Exemplary Embodiment

Figure 10:
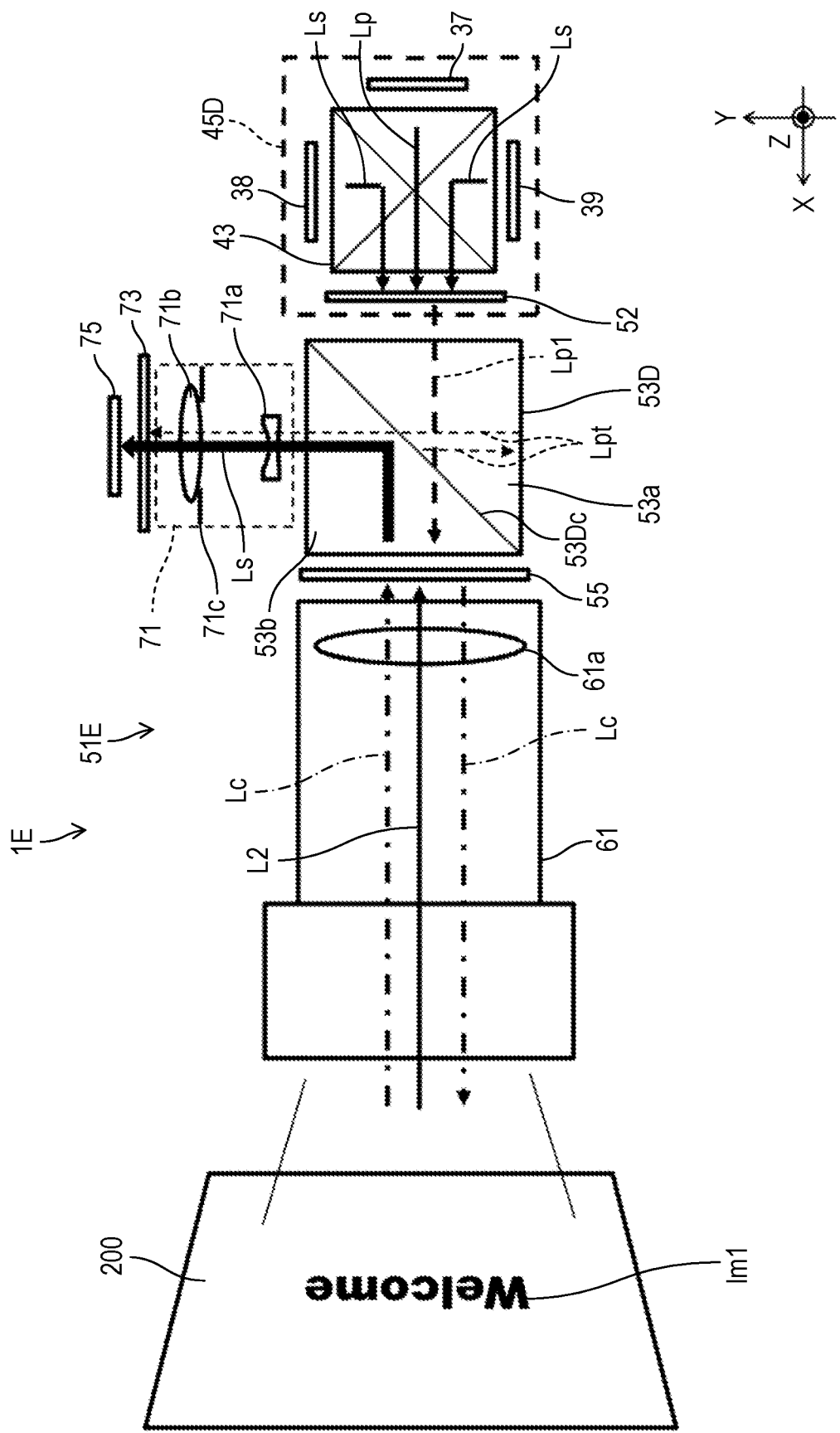
FIG. 10 is a diagram illustrating a configuration of a projection imaging optical system according to a sixth exemplary embodiment.

Next, projection imaging optical system 51E and projection display apparatus 1E according to a sixth exemplary embodiment will be described with reference to FIG. 10. FIG. 10 is a diagram illustrating a configuration of projection imaging optical system 51E according to the sixth exemplary embodiment.

Projection imaging optical system 51E according to the sixth exemplary embodiment is different from projection imaging optical system 51D according to the fifth exemplary embodiment in that ¼ wave plate 55 and polarizing plate 73 are further provided as illustrated in FIG. 10. Projection display apparatus 1D according to the fifth exemplary embodiment and projection display apparatus 1E according to the sixth exemplary embodiment have common configurations other than this point and the points to be described below, and thus, the description thereof will be omitted.

¼ wave plate 55 is disposed on an optical axis between optical path separation element 53D and projection lens unit 61, converts incident linearly polarized light into circularly polarized light and emits the circularly polarized light, and converts the incident circularly polarized light into linearly polarized light and emits the linearly polarized light. Thus, ¼ wave plate 55 converts P-polarized image light Lp1 incident from narrowband retarder plate 52 into circularly polarized image light Lc. Image light Lc emitted from ¼ wave plate 55 is enlarged by projection lens unit 61 and is projected on screen 200, and image Im1 is projected on screen 200.

Circularly polarized image light Lc constituting image Im1 on screen 200 is reflected by screen 200, is incident on projection lens unit 61, travels toward optical path separation element 53, and is incident on ¼ wave plate 55. Circularly polarized image light Lc incident on ¼ wave plate 55 is converted into S-polarized image light Ls and is incident on optical path separation element 53.

S-polarized image light Ls incident on optical path separation element 53 is reflected by partial reflection coating 53Dc, is changed in a traveling direction by 90 degrees, and is incident on condensing optical system 71. S-polarized image light Ls incident on condensing optical system 71 passes through condensing optical system 71 and is incident on polarizing plate 73.

Polarizing plate 73 is disposed between condensing optical system 71 and imaging element 75 and transmits the linearly polarized light. In the sixth exemplary embodiment, polarizing plate 73 transmits S-polarized image light Ls and blocks light in a polarization state other than the S-polarized light. Thus, S-polarized image light Ls passing through condensing optical system 71 is transmitted through polarizing plate 73 and is incident on imaging element 75, but the stray light other than the S-polarized light is blocked by polarizing plate 73. A surface of polarizing plate 73 facing imaging element 75 is larger than an imaging surface of imaging element 75.

Since polarizing plate 73 is disposed between optical path separation element 53 and imaging element 75, P-polarized stray light Lt emitted from optical path separation element 53 toward imaging element 75 can be blocked by polarizing plate 73. Thus, since P-polarized stray light Lt can be prevented from being incident on imaging element 75 and the noise of stray light Lt can be reduced, image Im1 with a greatly improved S/N ratio can be imaged.

As described above, when image Im1 projected on screen 200 is incident on optical path separation element 53 via projection lens unit 61 again, the image light is converted into the S-polarized light, and thus, the amount of light of an external image directed to imaging element 75 can be increased. Accordingly, the signal can be amplified.

In accordance with projection imaging optical system 51E and projection display apparatus 1E according to the sixth exemplary embodiment, partial reflection coating 53Dc which is the polarization separation coating transmits P-polarized image light Lp1 (an example of the first polarization state of one of the P-polarized light and the S-polarized light) incident from image light emitter 45D, and reflects S-polarized image light Ls (an example of a second polarization state of the other of the P-polarized light and the S-polarized light). Projection imaging optical system 51E includes the ¼ wave plate that is disposed between optical path separation element 53 and projection lens unit 61, converts P-polarized image light Lp1 into circularly polarized image light Lc, and converts circularly polarized image light Lc reflected by screen 200 into S-polarized image light Ls, and polarizing plate 73 that is disposed between optical path separation element 53 and imaging element 75, and transmits the S-polarized external light.

Image light Lp1 emitted from image light emitter 45D has polarization of one of P-polarized light and S-polarized light, and image light Lp1 emitted from image light emitter 45 is converted into circularly polarized image light Lc by a ¼ wave plate and projected on screen 200. Image Im1 projected on screen 200 is reflected by screen 200, is incident, as a part of the external light, on the ¼ wave plate again, and is converted from circularly polarized image light Lc into the other polarized light different from the polarized light when the light is emitted from image light emitter 45. The other polarized light is reflected by optical path separation element 53, is changed in a traveling direction, is transmitted through polarizing plate 73, and is incident on imaging element 75.

As described above, since the polarization state of image light Lp1 emitted from optical path separation element 53D toward screen 200 and the polarization state of image light Ls included in external light L2 reflected by screen 200 and incident on optical path separation element 53D are different polarization states of the P-polarized light and the S-polarized light, only the light in the polarization state of the image light reflected by screen 200 can be incident on imaging element 75 by polarizing plate 73. Thus, even though image light Lp1 incident from image light emitter 45D becomes stray light by reflection within optical path separation element 53, travels toward imaging element 75, and passes through condensing optical system 71, the stray light can be blocked by polarizing plate 73. Since external light L2 other than the image light generally includes a large amount of natural light, only the light component having the same state as the polarization state of the image light reflected by screen 200 can be incident on imaging element 75. Thus, the image light reflected by screen 200 and image Im1 on screen 200 illuminated with the external light can be simultaneously captured.

Polarizing plate 73 may be configured to be rotatable manually or by motor driving. A rotation angle of polarizing plate 73 is adjusted, and thus, the amount of S-polarized image light Ls incident on imaging element 75 can be adjusted. Accordingly, the balance with the amount of captured external light can be adjusted.

Seventh Exemplary Embodiment

Figure 11:
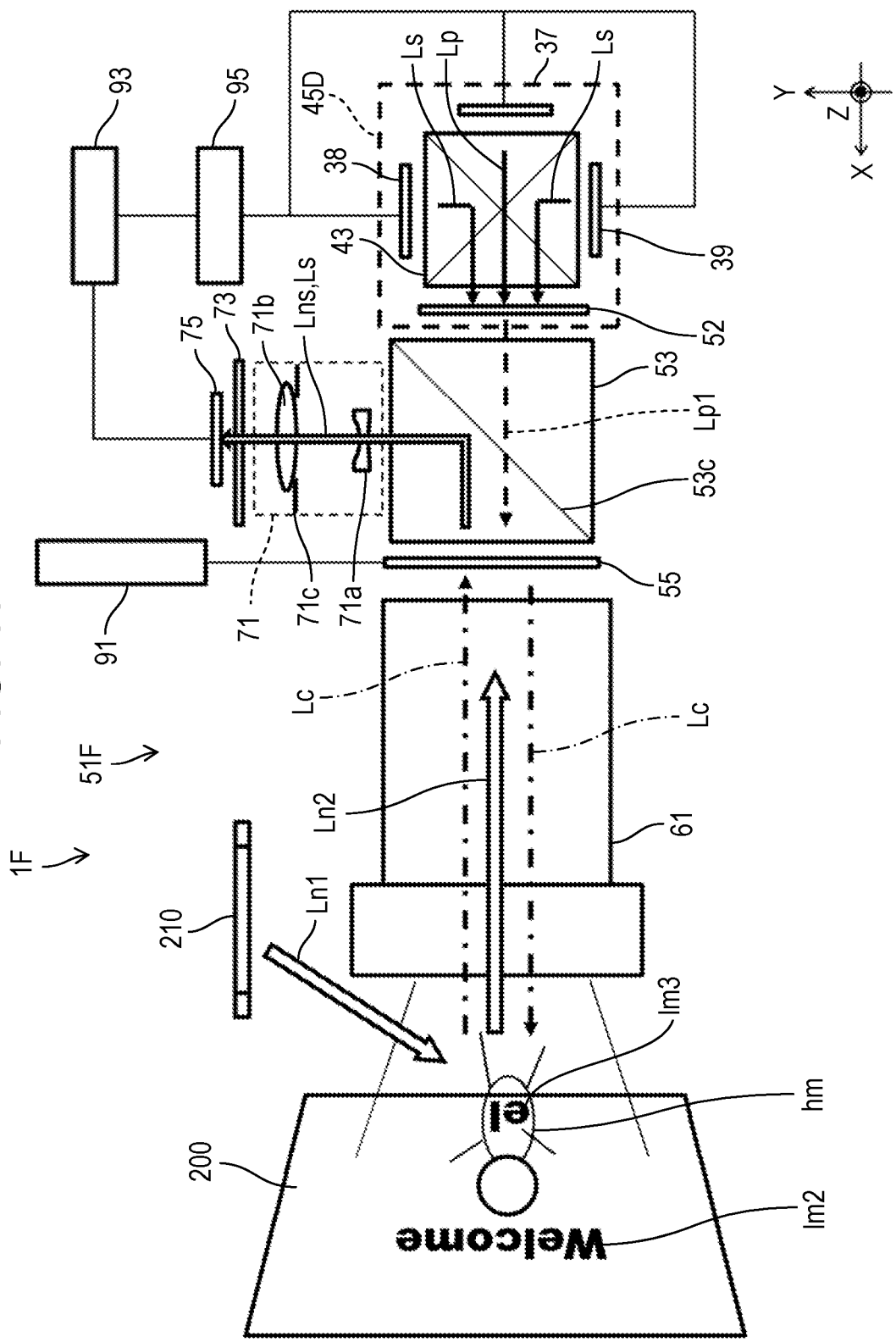
FIG. 11 is a diagram illustrating a configuration of a projection imaging optical system according to a seventh exemplary embodiment.

Next, projection imaging optical system 51F and projection display apparatus 1F according to a seventh exemplary embodiment will be described with reference to FIG. 11. FIG. 11 is a diagram illustrating a configuration of projection imaging optical system 51F according to the seventh exemplary embodiment.

As illustrated in FIG. 11, projection imaging optical system 51F according to the seventh exemplary embodiment is different from projection imaging optical system 51E according to the sixth exemplary embodiment in that ¼ wave plate 55 is insertable and removable to and from an optical path of image light Lp incident on projection lens unit 61 from optical path separation element 53. Projection display apparatus 1E according to the sixth exemplary embodiment and projection display apparatus 1F according to the seventh exemplary embodiment have common configurations other than this point and the points to be described below, and thus, the description thereof will be omitted.

Projection imaging optical system 51F includes driver 91 that inserts and removes ¼ wave plate 55 to and from an optical path of image light incident on projection lens unit 61 from optical path separation element 53. Driver 91 inserts and removes ¼ wave plate 55 to and from the optical path according to an instruction from a user. Driver 91 includes, for example, an actuator and a rod. Driver 91 may insert and remove ¼ wave plate 55 to and from the optical path by rotating ¼ wave plate 55. Note that, driver 91 may be omitted, and the user may manually insert and remove ¼ wave plate 55 to and from the optical path.

In the seventh exemplary embodiment, there may be object hm movable in front of screen 200. Object hm is, for example, a human or a robot. In the seventh exemplary embodiment, a part of the projected image light is projected, as image Im2, on screen 200, and a part of the projected image light is projected, as image Im3, on object hm. In FIG. 11, characters are illustrated as an example of images Im2, Im3.

Object hm may be illuminated with illumination light Ln1 from external illumination light source 210, or may be illuminated with ambient light around the screen. Illumination light Ln1 or the ambient light is unpolarized light. Illumination light Ln1 or reflected light Ln2 reflected by object hm by illuminating object hm with the ambient light is incident on ¼ wave plate 55 through projection lens unit 61.

Projection imaging optical system 51F may further include image processor 93 and controller 95. Image processor 93 recognizes object hm movable in front of screen 200 in an image imaged by imaging element 75. Image processor 93 is, for example, a processor or an arithmetic circuit such as a field programmable gate array (FPGA).

Controller 95 controls liquid crystal display elements 37, 38, 39 such that image Im3 follows the movement of object hm recognized by image processor 93. Controller 95 is, for example, a processor or an arithmetic circuit such as an FPGA.

Figure 12:
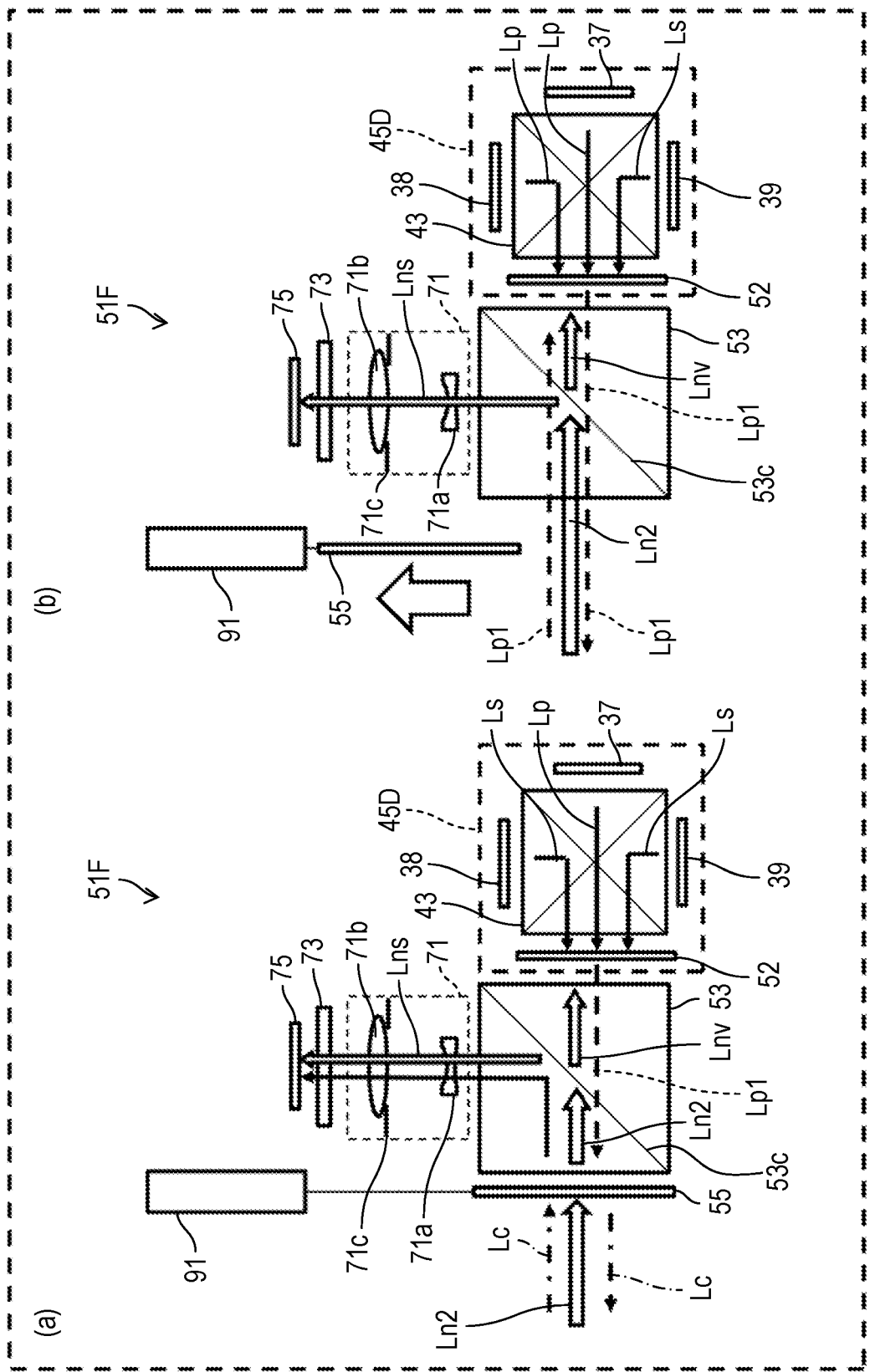
FIG. 12 is an explanatory diagram illustrating an optical path within the optical path separation element.
Figure 13:
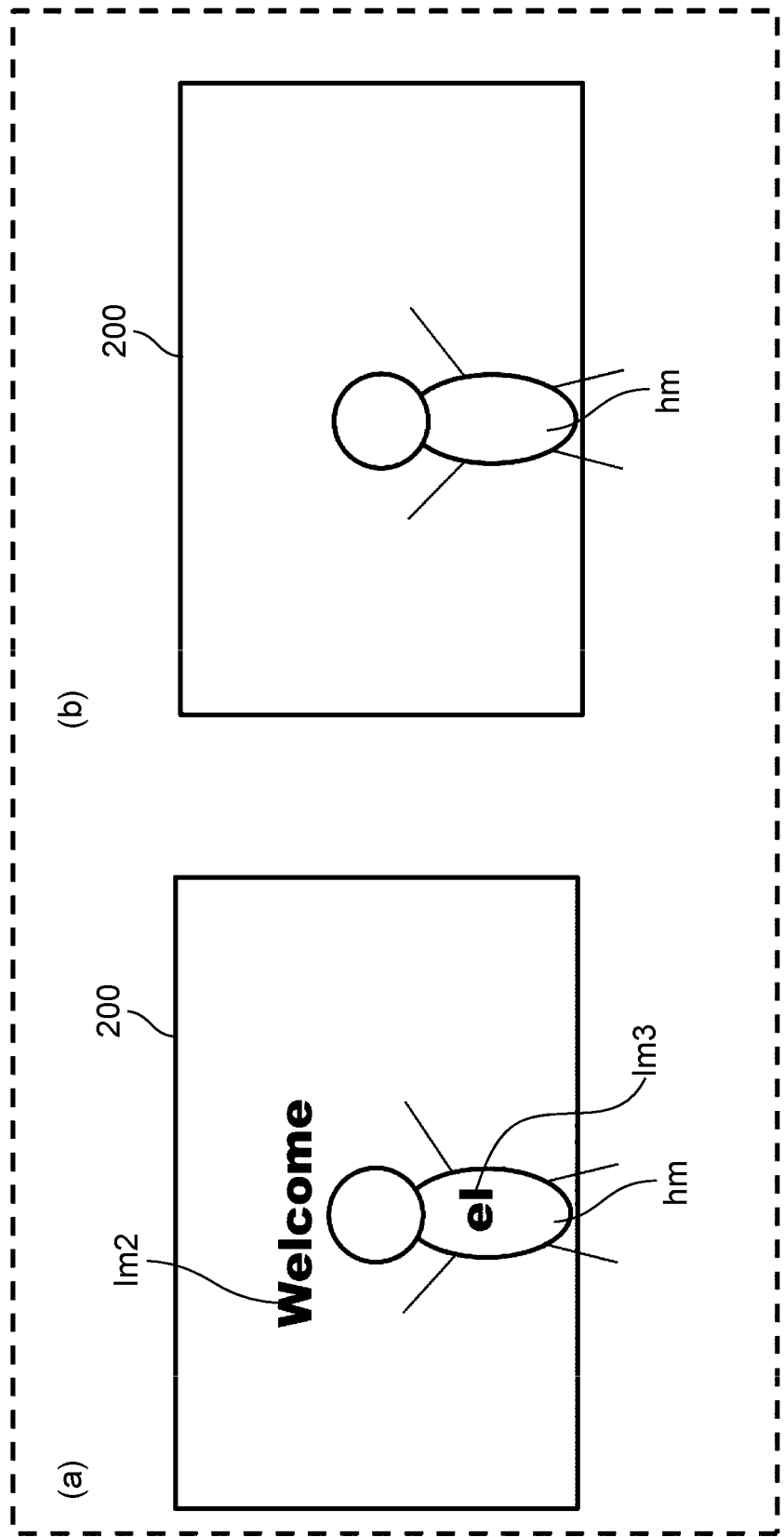
FIG. 13 is an explanatory diagram illustrating an image imaged by an imaging element.

Next, a change in properties of light by inserting and removing ¼ wave plate 55 to and from an optical path will be further described with reference to FIGS. 12 and 13. FIG. 12 is an explanatory diagram illustrating an optical path in the optical path separation element, part (a) of FIG. 12 is an explanatory diagram illustrating an optical path of projection imaging optical system 51F in a state where ¼ wave plate 55 is disposed on the optical path, and part (b) of FIG. 12 is an explanatory diagram illustrating an optical path of projection imaging optical system 51F in a state where ¼ wave plate 55 is removed from the optical path. FIG. 13 is an explanatory diagram illustrating an image imaged by imaging element 75, part (a) of FIG. 13 is an image imaged in a state where ¼ wave plate 55 is disposed on the optical path, and part (b) of FIG. 13 is an image imaged in a state where ¼ wave plate 55 is removed from the optical path.

As illustrated in part (a) of FIG. 12, when ¼ wave plate 55 is present on the optical path, even though non-polarized reflected light Ln2 is transmitted through ¼ wave plate 55 and a phase is rotated, non-polarized reflected light Ln2 is emitted from ¼ wave plate 55. Reflected light Ln2 emitted from ¼ wave plate 55 is incident on optical path separation element 53, only S-polarized component Lns is reflected by partial reflection coating 53c, is changed in a traveling direction by 90 degrees, and travels toward imaging element 75. Note that, remaining component Lnv of reflected light Ln2 passes through partial reflection coating 53c and travels straight toward narrowband retarder plate 52. S-polarized component Lns of reflected light Ln2 is emitted from optical path separation element 53, is transmitted through condensing optical system 71 and polarizing plate 73, and is incident on imaging element 75. As a result, S-polarized component Lns of reflected light Ln2 is imaged by imaging element 75 together with S-polarized image light Ls projected and reflected on screen 200.

Thus, when ¼ wave plate 55 is present on the optical path, as illustrated in part (a) of FIG. 13, image Im2 projected on screen 200, object hm illuminated with illumination light Ln1 of external illumination light source 210, and image Im3 projected on object hm can be imaged together.

On the other hand, as illustrated in part (b) of FIG. 12, when ¼ wave plate 55 is removed from the optical path and ¼ wave plate 55 does not exist on the optical path, P-polarized image light Lp1 emitted from image light emitter 45 is directly projected on screen 200 as it is. Image Im2 projected on screen 200 and image Im3 projected on object hm are P-polarized image light Lp1. Since image light Lp1 reflected by screen 200 and object hm pass through projection lens unit 61 and are also transmitted through optical path separation element 53, the image light rays do not travel to imaging element 75.

Thus, only S-polarized component Lns of reflected light Ln2 is reflected by partial reflection coating 53c of optical path separation element 53 and travels toward imaging element 75. As a result, P-polarized image light Lp1 projected and reflected on screen 200 is not imaged, and only S-polarized component Lns of reflected light Ln2 is imaged by imaging element 75.

Thus, when ¼ wave plate 55 is not present on the optical path, as illustrated in part (b) of FIG. 13, an image including only the illumination light and the ambient light reflected by screen 200 and object hm is imaged. As described above, since the image not affected by the projection light can be imaged, object hm is detected by using the image not including the projection light and is combined with a projected image, and thus, the mapping following object hm can be performed.

In accordance with projection imaging optical system 51F and projection display apparatus 1F according to the seventh exemplary embodiment, ¼ wave plate 55 is insertable and removable to and from the optical path of the image light incident from optical path separation element 53 to projection lens unit 61. As a result, image Im2 projected on screen 200, object hm illuminated with illumination light Ln1 of external illumination light source 210, and image Im3 projected on object hm can be imaged together, or the image including only the illumination light and the ambient light reflected by screen 200 and object hm can be imaged.

Since illumination light and ambient light often have a small amount of light, as illustrated in part (b) of FIG. 13, when an image is imaged except for a projected image, it is preferable that stray light generated from optical path separation element 53 or lens 61a of projection lens unit 61 is reliably removed not to enter imaging element 75. Thus, a configuration for removing the stray light by using condensing optical system 71 is very effective. Since the configuration for removing the stray light according to the second exemplary embodiment is also very effective, it is also very useful to combine the seventh exemplary embodiment and the second exemplary embodiment.

At least a part of the projection target includes movable object hm, and projection display apparatus 1F includes image processor 93 that recognizes object hm in the image imaged by imaging element 75 by image processing, and controller 95 that performs display control of the image light emitted from image light emitter 45 according to the movement of object hm to project the image light on object hm in the image.

Eighth Exemplary Embodiment

Figure 14:
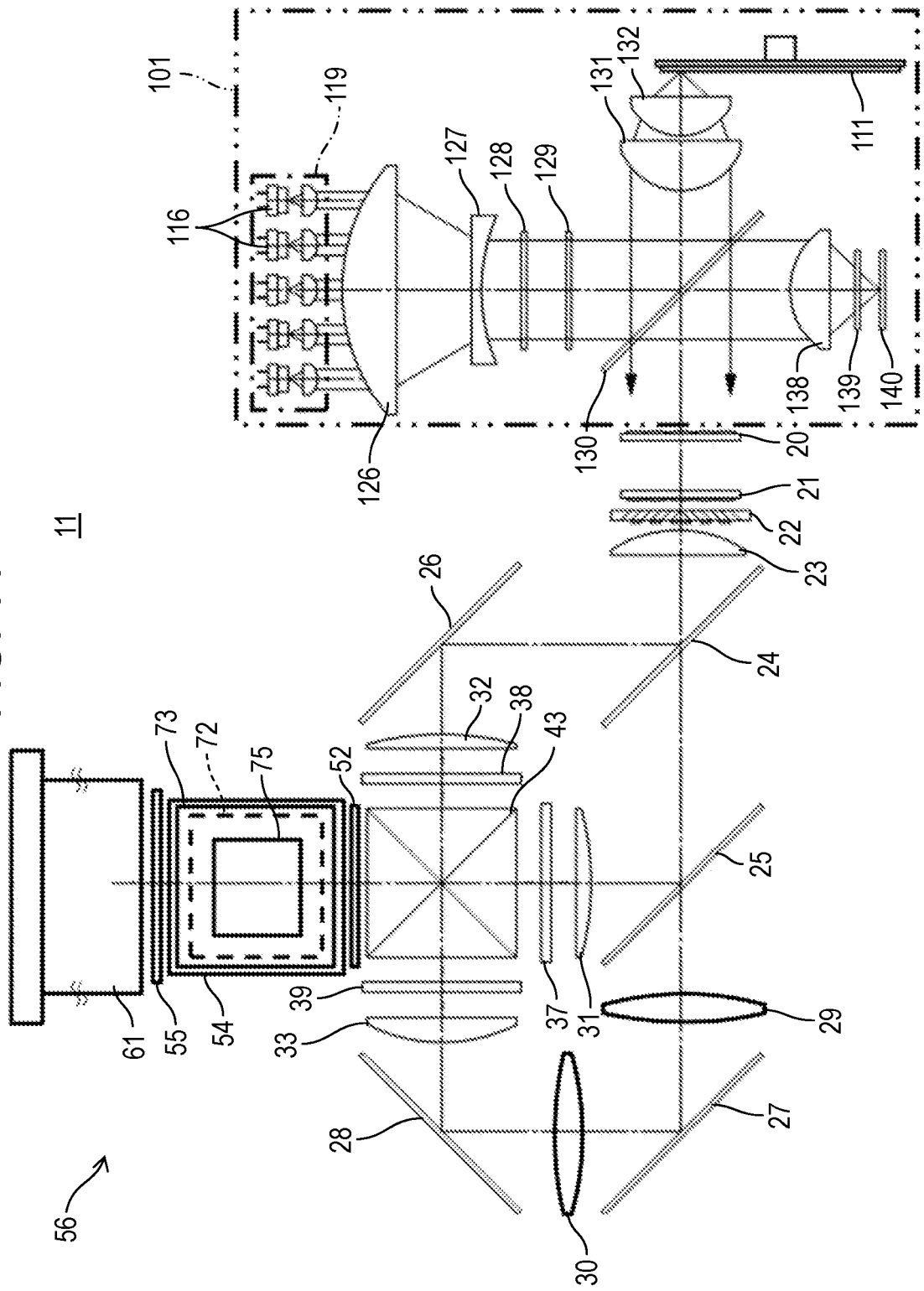
FIG. 14 is a diagram illustrating a configuration of a projection display apparatus according to an eighth exemplary embodiment.
Figure 15:
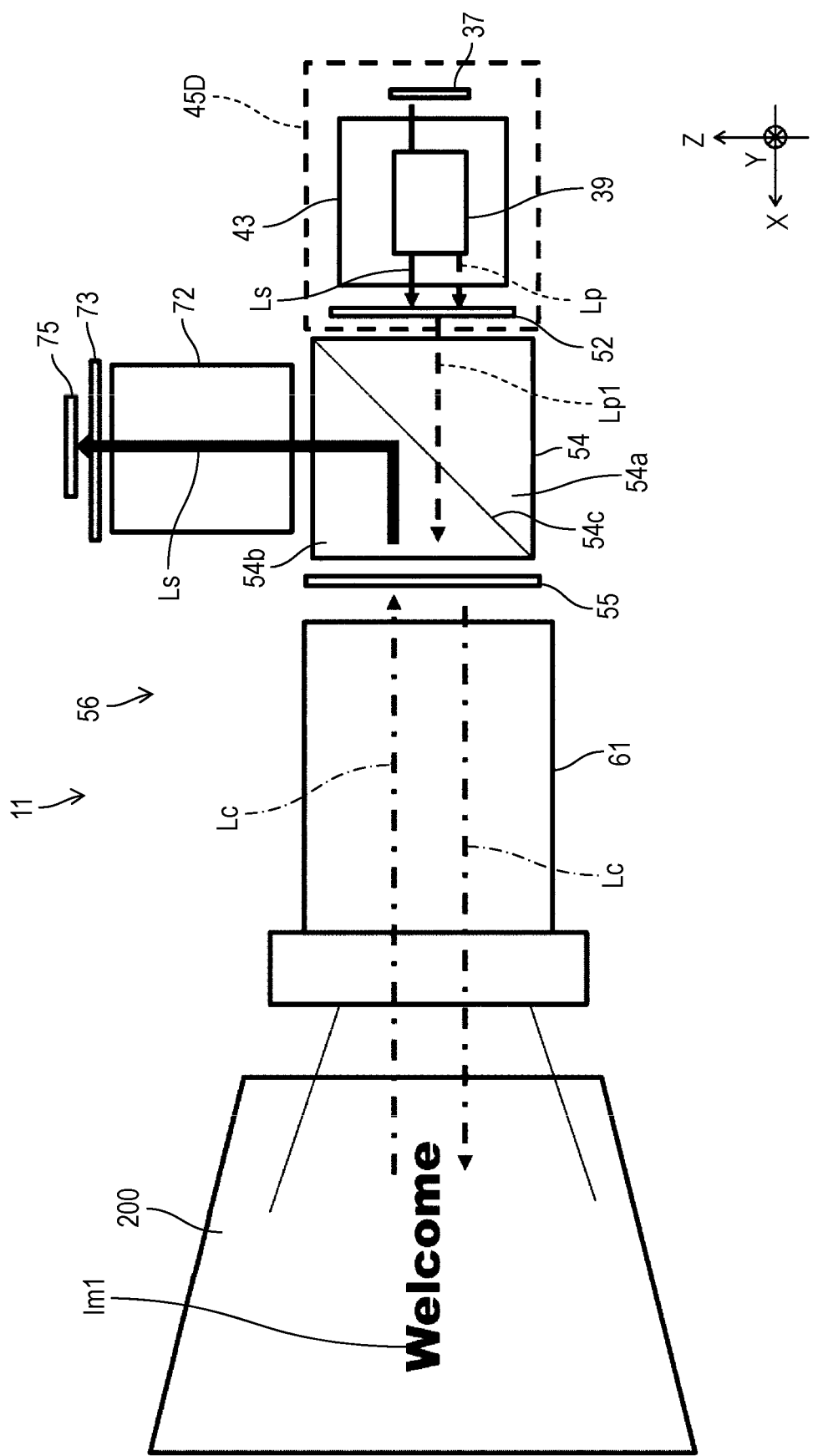
FIG. 15 is a diagram illustrating a configuration of a projection imaging optical system according to the eighth exemplary embodiment.

Projection display apparatus 11 and projection imaging optical system 56 according to an eighth exemplary embodiment will be described with reference to FIGS. 14 and 15. FIG. 14 is a diagram illustrating a configuration of projection display apparatus 11. As illustrated in FIGS. 14 and 15, projection imaging optical system 56 of projection display apparatus 11 according to the eighth exemplary embodiment is different from projection imaging optical system 51E according to the sixth exemplary embodiment including optical path separation element 53D and condensing optical system 71 in that optical path separation element 54 and prism spacer 72 are provided. Projection display apparatus 11 according to the eighth exemplary embodiment and projection display apparatus 1E according to the sixth exemplary embodiment have common configurations other than this point and the points to be described below, and thus, the description thereof will be omitted.

Next, projection imaging optical system 56 will be described with reference to FIG. 15. FIG. 15 is a diagram illustrating a configuration of projection imaging optical system 56. Projection imaging optical system 56 includes image light emitter 45D, optical path separation element 54, ¼ wave plate 55, projection lens unit 61, prism spacer 72, polarizing plate 73, and imaging element 75. Image light emitter 45D includes liquid crystal display elements 37, 38, 39, color combining prism 43, and narrowband retarder plate 52. In the present exemplary embodiment, S-polarized light is polarized light having a vibration surface perpendicular to the paper surface of the drawing, and P-polarized light is polarized light having a vibration surface parallel to the paper surface of the drawing.

Color combining prism 43, narrowband retarder plate 52, optical path separation element 54, ¼ wave plate 55, and projection lens unit 61 are arranged in this order along an optical axis of light emitted from color combining prism 43. Prism spacer 72, polarizing plate 73, and imaging element 75 are arranged in a direction perpendicular to the optical axis of the light emitted from color combining prism 43. In the eighth exemplary embodiment, these components are arranged above optical path separation element 54.

Narrowband retarder plate 52 aligns the polarized light rays emitted from liquid crystal display elements 37, 38, 39 and emits the polarized light rays to optical path separation element 54. In the eighth exemplary embodiment, as an example, image light Ls which is S-polarized light is emitted from liquid crystal display element 37, and image light Lp which is P-polarized light is emitted from liquid crystal display elements 38, 39. However, narrowband retarder plate 52 converts incident S-polarized image light Ls into P-polarized image light Lp1 and emits the P-polarized image light, and emits incident P-polarized image light Lp as P-polarized image light Lp1 as it is.

Optical path separation element 54 is, for example, an optical path separation prism, and includes first prism 54a and second prism 54b. First prism 54a and second prism 54b are bonded to each other, and polarization separation coating 54c is disposed on a bonding surface between first prism 54a and second prism 54b. Optical path separation element 54 transmits incident P-polarized image light Lp1, reflects incident S-polarized image light Ls, and is bent in a traveling direction by 90 degrees. Thus, image light Lp1 incident from narrowband retarder plate 52 is transmitted through optical path separation element 54 and is emitted toward ¼ wave plate 55.

¼ wave plate 55 converts the incident linearly polarized light into circularly polarized light and emits the circularly polarized light, and converts the incident circularly polarized light into linearly polarized light and emits the linearly polarized light. Thus, ¼ wave plate 55 converts P-polarized image light Lp1 incident from narrowband retarder plate 52 into circularly polarized image light Lc. Image light Lc emitted from ¼ wave plate 55 is enlarged by projection lens unit 61 and is projected on screen 200, and image Im1 is projected on screen 200.

Circularly polarized image light Lc constituting image Im1 on screen 200 is incident on projection lens unit 61, travels toward optical path separation element 54, and is incident on ¼ wave plate 55. Circularly polarized image light Lc incident on ¼ wave plate 55 is converted into S-polarized image light Ls and is incident on optical path separation element 54.

S-polarized image light Ls incident on optical path separation element 54 is reflected by optical path separation element 54, is changed in a traveling direction by 90 degrees, and is incident on prism spacer 72.

Prism spacer 72 is an element for aligning a back focus of imaging element 75. S-polarized image light Ls incident on prism spacer 72 is transmitted through prism spacer 72 and is incident on polarizing plate 73.

Polarizing plate 73 transmits linearly polarized light. In the eighth exemplary embodiment, polarizing plate 73 transmits S-polarized image light Ls and blocks light in a polarization state other than the S-polarized light. Thus, S-polarized image light Ls transmitted through prism spacer 72 is transmitted through polarizing plate 73 and is incident on imaging element 75, but stray light other than the S-polarized image light is blocked by polarizing plate 73. A surface of polarizing plate 73 facing imaging element 75 is larger than an imaging surface of imaging element 75.

Imaging element 75 images image Im1 by the incident S-polarized light. Imaging element 75 is, for example, a CMOS sensor or a CCD sensor.

As described above, image Im1 projected on screen 200 is converted into the S-polarized light when the image is incident on optical path separation element 54 via projection lens unit 61 again, and thus, the amount of light of the external image directed to imaging element 75 can be increased. Accordingly, the signal can be amplified.

As described above, in the eighth exemplary embodiment, projection display apparatus 11 includes image light emitter 45D that emits image light Lp1 in the first polarization state of one of the P-polarized light and the S-polarized light, and optical path separation element 54 having polarization separation coating 54c that transmits the image light in the first polarization state incident from image light emitter 45 and reflects the light in the second polarization state of the other of the P-polarized light and the S-polarized light. Projection display apparatus 11 further includes projection lens unit 61 that enlarges and projects image light Lp1 transmitted through optical path separation element 54 on screen 200 and on which external light including the image light reflected by screen 200 is incident, and a ¼ wave plate that is disposed between optical path separation element 54 and projection lens unit 61, converts image light Lp1 in the first polarization state into circularly polarized image light Lc, and converts circularly polarized image light Lc reflected by screen 200 into image light Ls in the second polarization state. Projection display apparatus 11 further includes imaging element 75 that images the external light via projection lens unit 61 and optical path separation element 54, and polarizing plate 73 that is disposed between optical path separation element 54 and imaging element 75 and transmits the external light in the second polarization state.

Image light Lp1 emitted from image light emitter 45D has one polarized light of the P-polarized light and the S-polarized light, and image light Lp1 emitted from image light emitter 45D by ¼ wave plate 55 is converted into circularly polarized image light Lc and is projected on screen 200. Image Im1 projected on screen 200 is reflected by screen 200, is incident, as external light, on ¼ wave plate 55 again, and is converted from circularly polarized image light Lc into the other polarized light different from the polarized light when the image light is emitted from image light emitter 45D. The other polarized light is reflected by optical path separation element 54, is changed in a traveling direction, is transmitted through polarizing plate 73, and is incident on imaging element 75.

As described above, since the polarized light of image light Lp1 emitted from optical path separation element 54 toward screen 200 and the polarized light of image light Ls as the external light reflected by screen 200 and incident on optical path separation element 54 are in different polarization states of the P-polarized light and the S-polarized light, only the light in the polarization state of the image light reflected by screen 200 can be incident on imaging element 75 by polarizing plate 73. Thus, even though image light Lp1 incident from image light emitter 45 becomes stray light due to reflection within optical path separation element 54 and travels toward imaging element 75, the image light can be blocked by polarizing plate 73. Since the external light other than the image light generally includes a large amount of natural light, only the light component having the same state as the polarization state of the image light reflected by screen 200 can be incident on imaging element 75. Thus, the image light reflected by screen 200 and image Im1 on screen 200 illuminated with the external light can be simultaneously captured.

Figure 16:
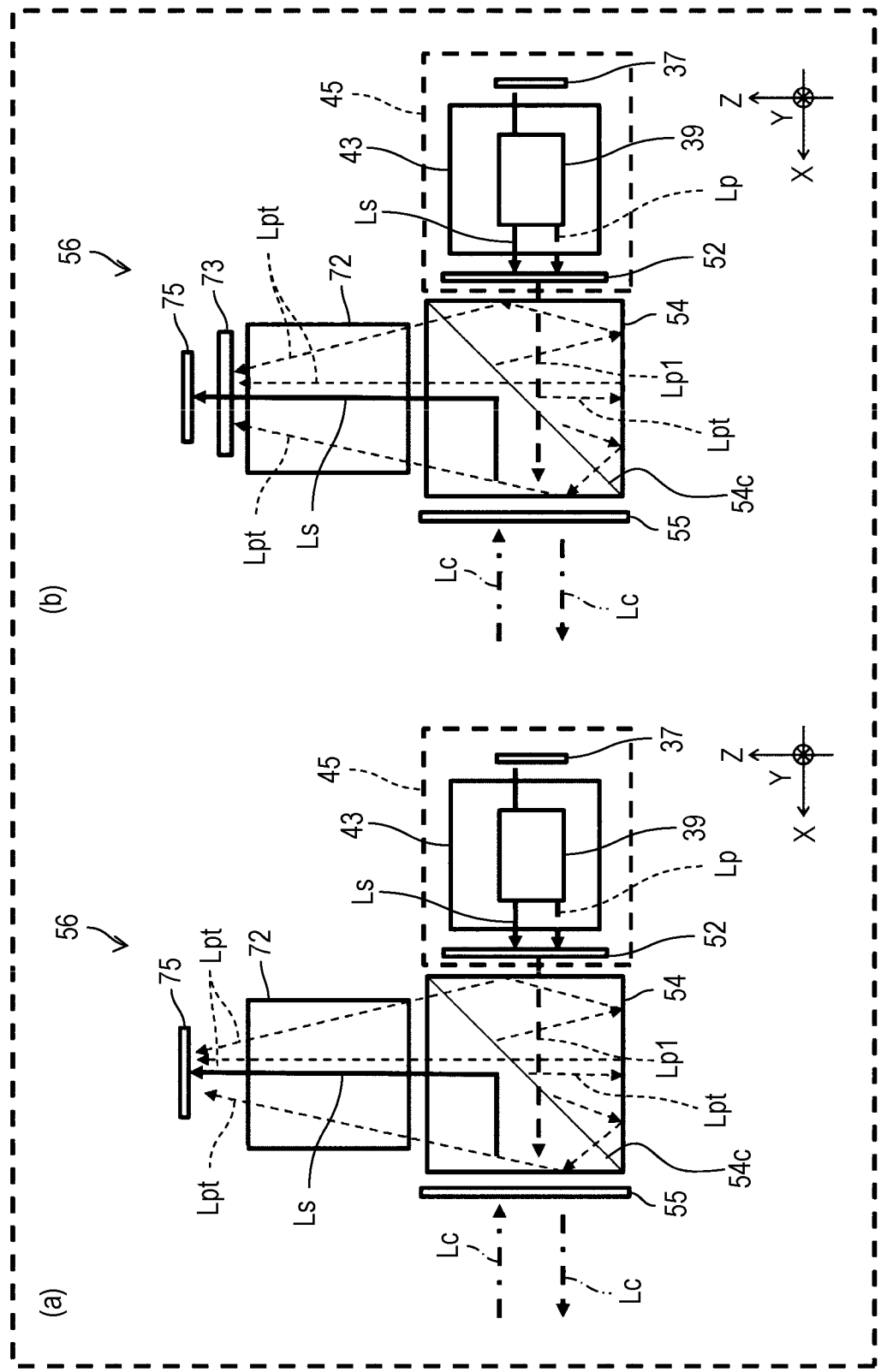
FIG. 16 is an explanatory diagram illustrating an optical path of stray light within an optical path separation prism.

Here, the reduction of the noise due to the stray light will be further described with reference to FIG. 16. FIG. 16 is an explanatory diagram illustrating an optical path of stray light in optical path separation element 54, part (a) of FIG. 16 is an explanatory diagram illustrating an optical path of a projection imaging optical system having no polarizing plate, and part (b) of FIG. 16 is an explanatory diagram illustrating an optical path of a projection imaging optical system having a polarizing plate.

As illustrated in part (a) of FIG. 16, P-polarized image light Lp1 incident on optical path separation element 54 from narrowband retarder plate 52 is not completely transmitted through polarization separation coating 54c of optical path separation element 54, but is partially reflected to become stray light Lpt that is repeatedly reflected within optical path separation element 54. A part of P-polarized stray light Lpt is emitted from optical path separation element 54 toward imaging element 75. Thus, since P-polarized stray light Lpt is incident on imaging element 75 separately from S-polarized image light Ls reflected from screen 200, an image in which noise of stray light Lpt is superimposed on image Im1 projected on screen 200 is imaged.

On the other hand, in projection imaging optical system 56 according to the eighth exemplary embodiment, as illustrated in part (b) of FIG. 16, since polarizing plate 73 is disposed between optical path separation element 54 and imaging element 75, stray light Lpt of the P-polarized light emitted from optical path separation element 54 toward imaging element 75 can be blocked by polarizing plate 73. Thus, since P-polarized stray light Lpt can be prevented from being incident on imaging element 75 and the noise of stray light Lpt can be reduced, image Im1 with a greatly improved S/N ratio can be imaged.

Polarizing plate 73 may be configured to be rotatable manually or by motor driving. A rotation angle of polarizing plate 73 is adjusted, and thus, the amount of S-polarized image light Ls incident on imaging element 75 can be adjusted. Accordingly, the balance with the amount of captured external light can be adjusted.

Figure 17:
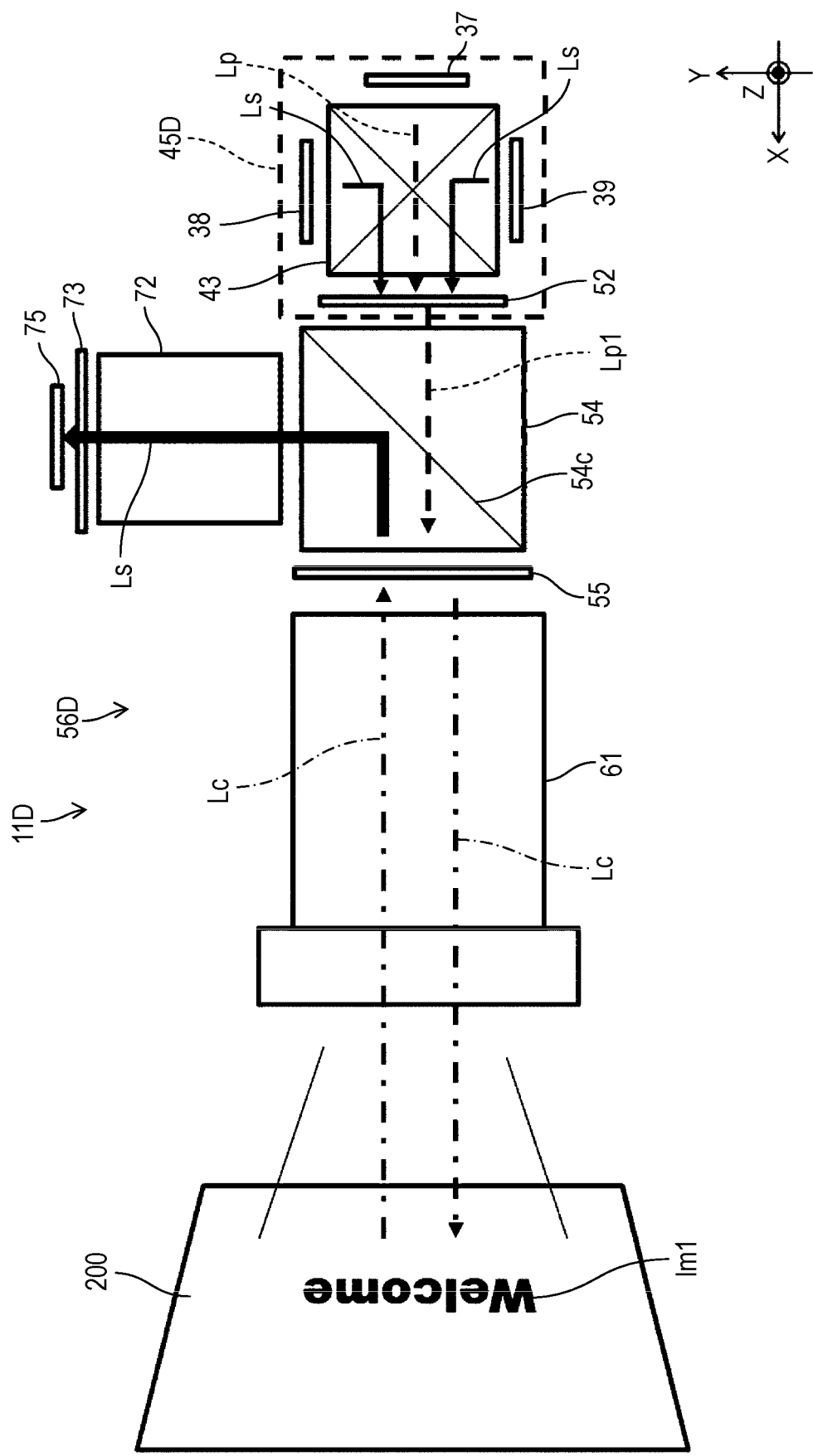
FIG. 17 is a diagram illustrating a configuration of a projection imaging optical system according to a modification of the eighth exemplary embodiment.

Next, a modification of the eighth exemplary embodiment will be described with reference to FIG. 17. FIG. 17 is a diagram illustrating a configuration of projection imaging optical system 56D of projection display apparatus 11D according to the modification of the eighth exemplary embodiment. In the eighth exemplary embodiment, prism spacer 72, polarizing plate 73, and imaging element 75 are arranged above optical path separation element 54, but the present disclosure is not limited thereto. Prism spacer 72, polarizing plate 73, and imaging element 75 may be disposed on a side of optical path separation element 54. A phase of narrowband retarder plate 52 according to the modification is inverted by 90 degrees from a phase of narrowband retarder plate 52 according to the eighth exemplary embodiment.

Ninth Exemplary Embodiment

Figure 18:
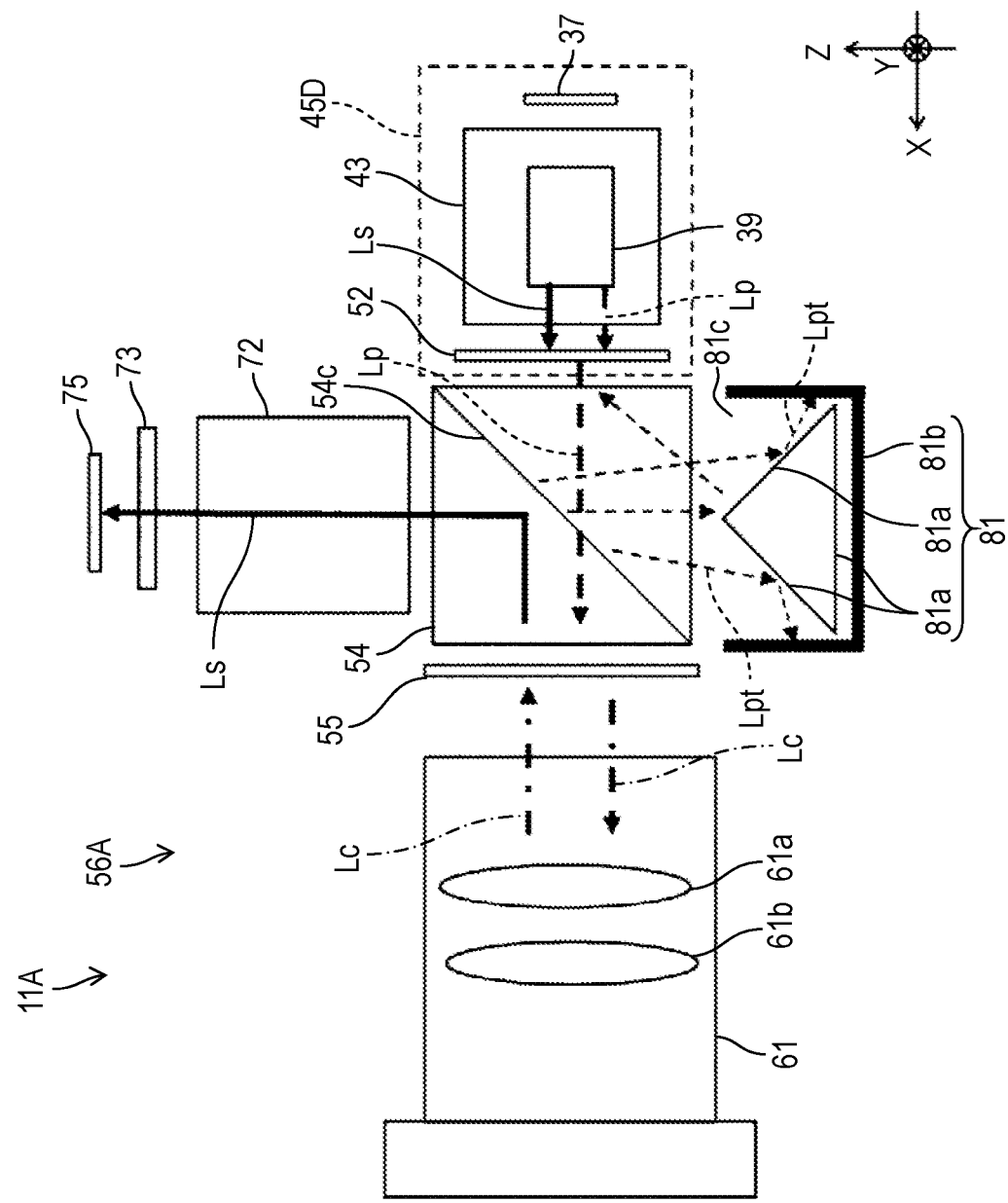
FIG. 18 is a diagram illustrating a configuration of a projection imaging optical system according to a ninth exemplary embodiment.

Next, projection imaging optical system 56A and projection display apparatus 11A according to a ninth exemplary embodiment will be described with reference to FIG. 18. FIG. 18 is a diagram illustrating a configuration of projection imaging optical system 56A according to the ninth exemplary embodiment.

Projection imaging optical system 56A according to the ninth exemplary embodiment is different from projection imaging optical system 56 according to the eighth exemplary embodiment in that reflected light attenuator 81 is provided as illustrated in FIG. 18. Projection display apparatus 11 according to the eighth exemplary embodiment and projection display apparatus 11A according to the ninth exemplary embodiment have common configurations other than this point and the points to be described below, and thus, the description thereof will be omitted.

Reflected light attenuator 81 is disposed on a side opposite to polarizing plate 73 and imaging element 75 with respect to optical path separation element 54, and is disposed below optical path separation element 54 in FIG. 18. Thus, optical path separation element 54 is disposed between reflected light attenuator 81 and prism spacer 72.

Reflected light attenuator 81 attenuates stray light emitted from optical path separation element 54 toward reflected light attenuator 81. Reflected light attenuator 81 includes reflected light attenuation plate 81*a* and reflected light absorber 81*b*.

Reflected light attenuation plate 81*a* prevents stray light Lpt incident from optical path separation element 54 from being reflected toward optical path separation element 54. Reflected light attenuation plate 81*a* is disposed to be inclined with respect to optical path separation element 54. A plurality of reflected light attenuation plates 81*a* may be arranged in a triangular shape.

Reflected light absorber 81*b* absorbs stray light Lpt reflected by reflected light attenuation plate 81*a*. Reflected light absorber 81*b* is, for example, a container that accommodates reflected light attenuation plate 81*a*, and has opening 81*c* on the optical path separation prism side.

In accordance with projection imaging optical system 56A and projection display apparatus 11A according to the ninth exemplary embodiment, reflected light attenuator 81 that is disposed on the side opposite to imaging element 75 with respect to optical path separation element 54 and attenuates the image light reflected within optical path separation element 54 is provided. It is possible to prevent stray light Lpt which is originally image light Lp from being emitted from optical path separation element 54 in a direction opposite to imaging element 75, being reflected by an external structure of optical path separation element 54, being incident on optical path separation element 54 again, and being directed to imaging element 75. As a result, it is possible to prevent a temperature rise and a deterioration due to high temperature of polarizing plate 73 when the luminance of the light from light source device 101 is increased, and it is possible to improve reliability of projection imaging optical system 56A.

Reflected light attenuator 81 includes reflected light attenuation plate 81*a* disposed to be inclined with respect to optical path separation element 54, and reflected light absorber 81*b* that absorbs the image light reflected by reflected light attenuation plate 81*a*. Since reflected light attenuation plate 81*a* is disposed to be inclined with respect to optical path separation element 54, when stray light Lpt which is originally image light Lp is reflected by reflected light attenuation plate 81*a*, the amount of light traveling in a direction different from optical path separation element 54 increases. Since reflected light absorber 81*b* absorbs stray light Lpt reflected by reflected light attenuation plate 81*a*, it is possible to prevent stray light Lpt from traveling toward imaging element 75 again.

Tenth Exemplary Embodiment

Figure 19:
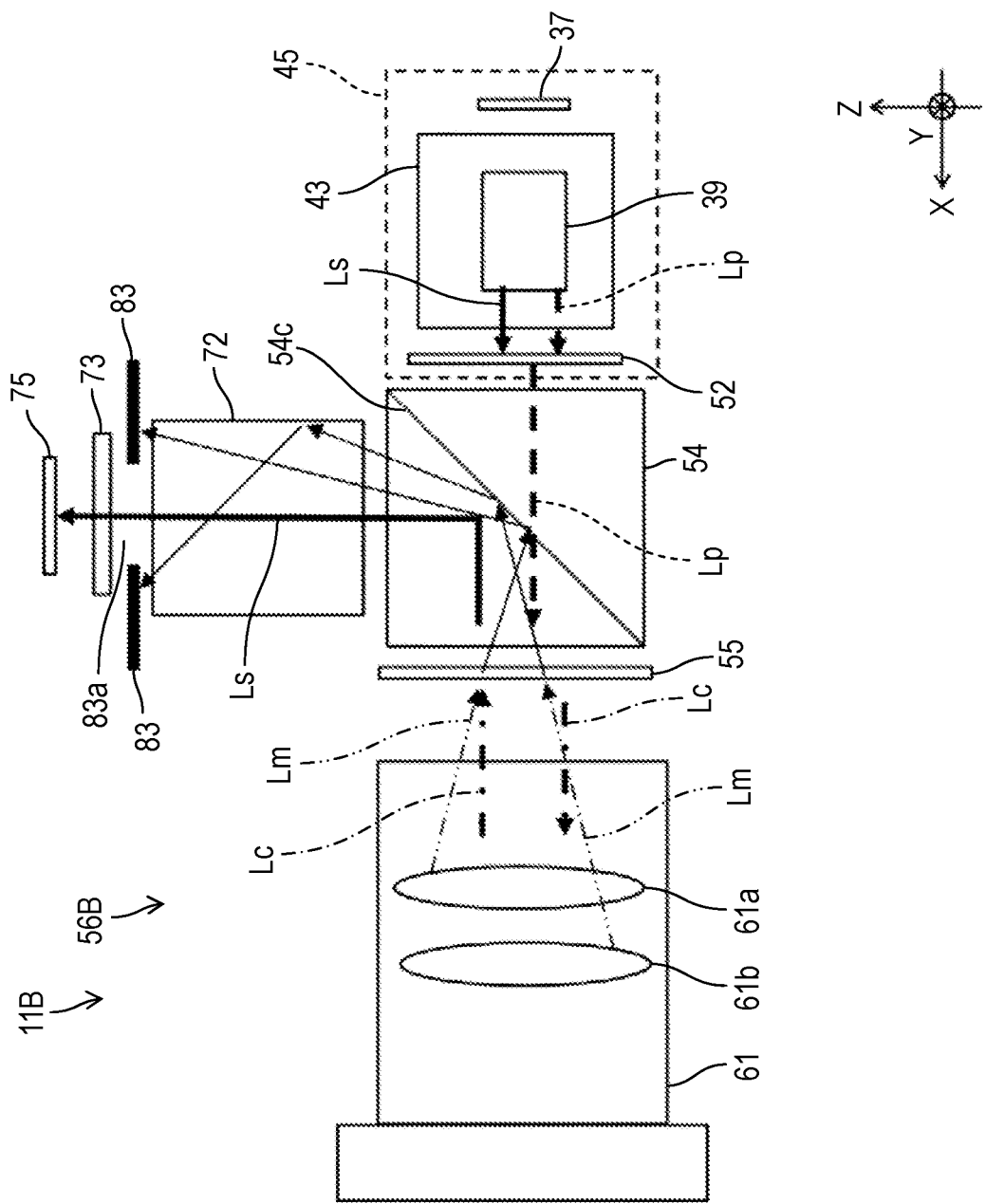
FIG. 19 is a diagram illustrating a configuration of a projection imaging optical system according to a tenth exemplary embodiment.

Next, projection imaging optical system 56B and projection display apparatus 11B according to a tenth exemplary embodiment will be described with reference to FIG. 19. FIG. 19 is a diagram illustrating a configuration of projection imaging optical system 56B according to the tenth exemplary embodiment.

As illustrated in FIG. 19, projection imaging optical system 56B according to the tenth exemplary embodiment is different from projection imaging optical system 56 according to the eighth exemplary embodiment in that diaphragm 83 according to the eighth exemplary embodiment is provided. Projection display apparatus 11 according to the eighth exemplary embodiment and projection display apparatus device 11B according to the tenth exemplary embodiment have common configurations other than this point and the points to be described below, and thus, the description thereof will be omitted.

Diaphragm 83 reduces stray light incident on imaging element 75 from optical path separation element 54. Diaphragm 83 is disposed between polarizing plate 73 and optical path separation element 54, for example, between polarizing plate 73 and prism spacer 72. Diaphragm 83 has opening 83*a* at a center. A size of opening 83*a* is a size through which a light flux of the image light reflected by screen 200 can pass. Since diaphragm 83 is disposed between polarizing plate 73 and optical path separation element 54, it is possible to reduce stray light Lpt caused by lenses 61*a*, 61*b* in projection lens unit 61 from being incident on imaging element 75.

In accordance with projection imaging optical system 56B and projection display apparatus 11B according to the tenth exemplary embodiment, diaphragm 83 disposed between optical path separation element 54 and polarizing plate 73 is provided. As a result, it is possible to reduce stray light Lpt in projection lens unit 61 from being incident on imaging element 75. Since the noise due to the stray light can be reduced, imaging element 75 can image image Im1 with a further improved S/N ratio.

Eleventh Exemplary Embodiment

Figure 20:
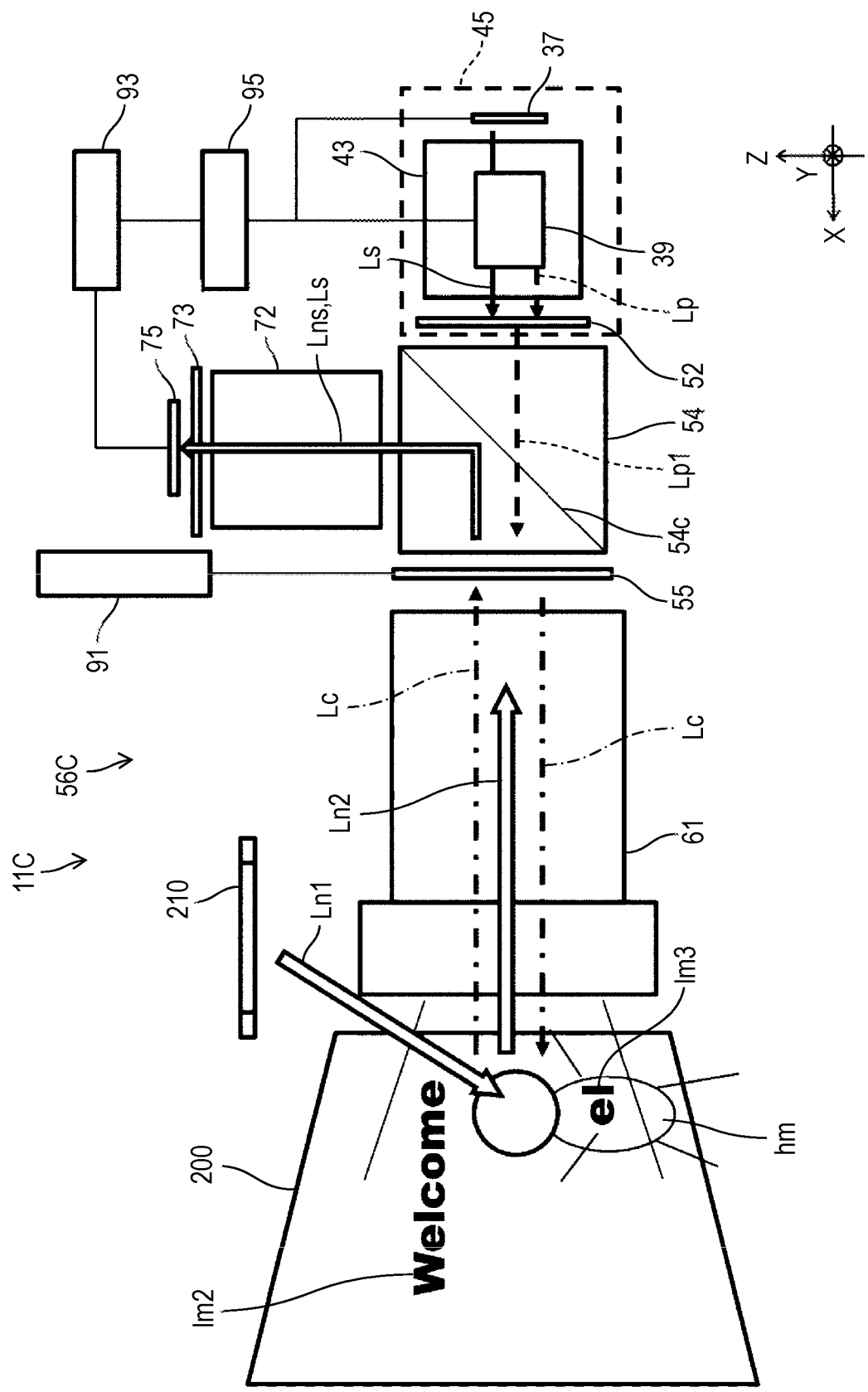
FIG. 20 is a diagram illustrating a configuration of a projection imaging optical system according to an eleventh exemplary embodiment.

Next, projection imaging optical system 56C and projection display apparatus 11C according to an eleventh exemplary embodiment will be described with reference to FIG. 20. FIG. 20 is a diagram illustrating a configuration of projection imaging optical system 56C according to the eleventh exemplary embodiment.

As illustrated in FIG. 20, projection imaging optical system 56C according to the eleventh exemplary embodiment is different from projection imaging optical system 56 according to the eighth exemplary embodiment in that ¼ wave plate 55 is insertable and removable to and from the optical path of image light Lp incident on projection lens unit 61 from optical path separation element 54. Projection display apparatus 11 according to the eighth exemplary embodiment and projection display apparatus 11C according to the eleventh exemplary embodiment have common configurations other than this point and the points to be described below, and thus, the description thereof will be omitted.

Projection imaging optical system 56C includes driver 91 that inserts and removes ¼ wave plate 55 to and from an optical path of image light incident on projection lens unit 61 from optical path separation element 54. Driver 91 inserts and removes ¼ wave plate 55 to and from the optical path according to an instruction from a user. Driver 91 includes, for example, an actuator and a rod. Driver 91 may insert and remove ¼ wave plate 55 to and from the optical path by rotating ¼ wave plate 55. Note that, driver 91 may be omitted, and the user may manually insert and remove ¼ wave plate 55 to and from the optical path.

In the eleventh exemplary embodiment, there may be object hm movable in front of screen 200. Object hm is, for example, a human or a robot. In the eleventh exemplary embodiment, a part of the projected image light is projected, as image Im2, on screen 200, and a part of the projected image light is projected, as image Im3, on object hm. In FIG. 20, characters are illustrated as an example of images Im2, Im3.

Object hm may be illuminated with illumination light Ln1 from external illumination light source 210, or may be illuminated with ambient light around the screen. Illumination light Ln1 or the ambient light is unpolarized light. Illumination light Ln1 or reflected light Ln2 reflected by object hm by illuminating object hm with the ambient light is incident on ¼ wave plate 55 through projection lens unit 61.

Projection imaging optical system 56C may further include image processor 93 and controller 95. Image processor 93 recognizes object hm movable in front of screen 200 in an image imaged by imaging element 75. Image processor 93 is, for example, a processor or an arithmetic circuit such as a field programmable gate array (FPGA).

Controller 95 controls liquid crystal display elements 37, 38, 39 as the light modulation elements to cause image Im3 to follow the movement of object hm recognized by image processor 93. Controller 95 is, for example, a processor or an arithmetic circuit such as an FPGA.

Figure 21:
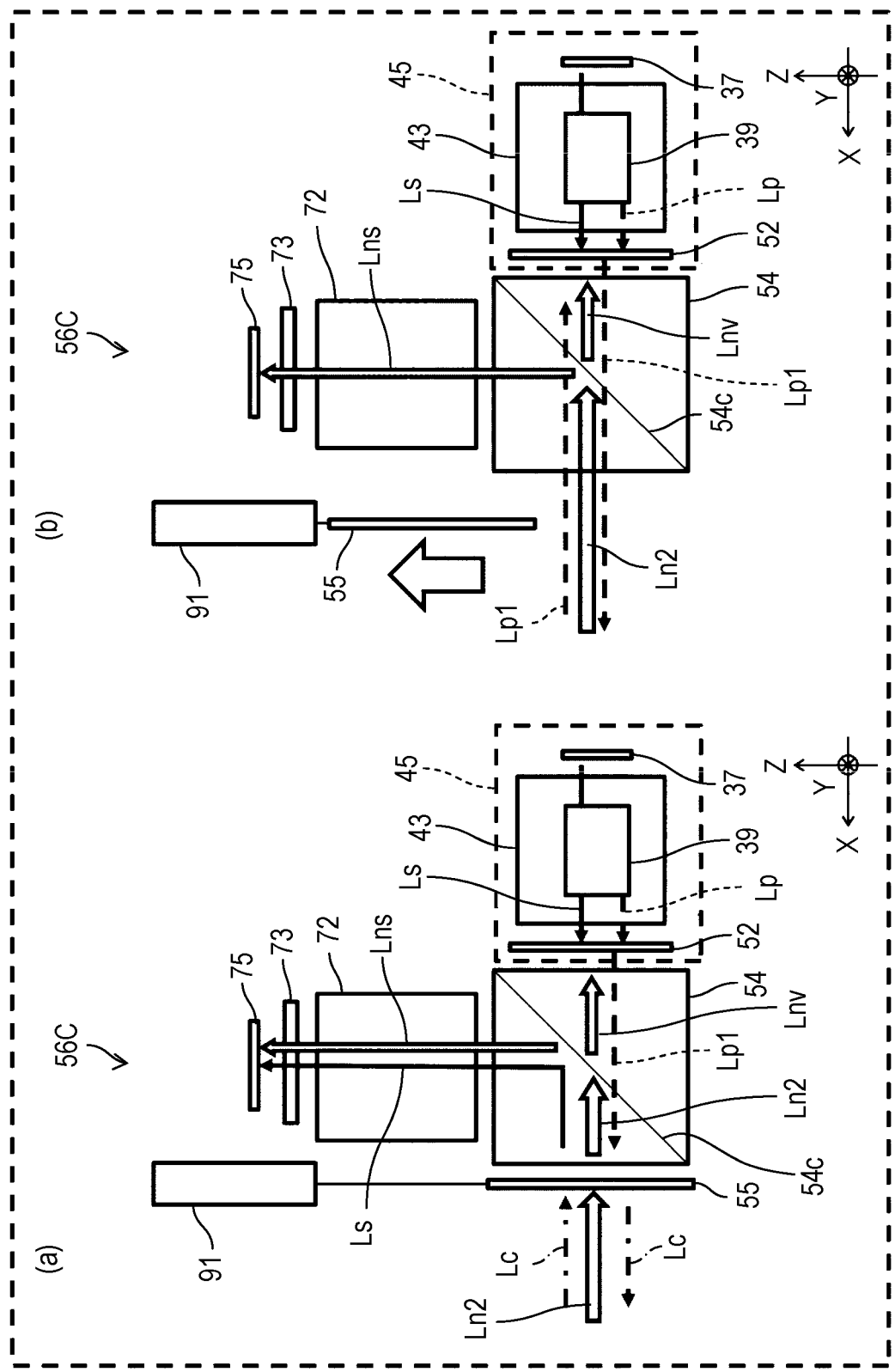
FIG. 21 is an explanatory diagram illustrating an optical path within an optical path separation prism.

Next, a change in light properties by inserting and removing ¼ wave plate 55 to and from the optical path will be described with reference to FIG. 21 and FIG. 13 described in the sixth exemplary embodiment. FIG. 21 is an explanatory diagram illustrating an optical path in the optical path separating prism, part (a) of FIG. 21 is an explanatory diagram illustrating an optical path of projection imaging optical system 56C in a state where ¼ wave plate 55 is disposed on the optical path, and part (b) of FIG. 21 is an explanatory diagram illustrating an optical path of projection imaging optical system 56C in a state where ¼ wave plate 55 is removed from the optical path. FIG. 13 is an explanatory diagram illustrating an image imaged by imaging element 75, part (a) of FIG. 13 is an image imaged in a state where ¼ wave plate 55 is disposed on the optical path, and part (b) of FIG. 13 is an image imaged in a state where ¼ wave plate 55 is removed from the optical path.

As illustrated in part (a) of FIG. 21, when ¼ wave plate 55 is present on the optical path, even though non-polarized reflected light Ln2 is transmitted through ¼ wave plate 55 and a phase is rotated, non-polarized reflected light Ln2 is emitted from ¼ wave plate 55. Reflected light Ln2 emitted from ¼ wave plate 55 is incident on optical path separation element 54, only S-polarized component Lns is reflected by polarization separation coating 54c, is changed in a traveling direction by 90 degrees, and travels toward imaging element 75. Note that, remaining component Lnv of reflected light Ln2 passes through polarization separation coating 54c and travels straight toward narrowband retarder plate 52. S-polarized component Lns of reflected light Ln2 is emitted from optical path separation element 54, is transmitted through prism spacer 72 and polarizing plate 73, and is incident on imaging element 75. As a result, S-polarized component Lns of reflected light Ln2 is imaged by imaging element 75 together with S-polarized image light Ls projected and reflected on screen 200.

Thus, when ¼ wave plate 55 is present on the optical path, as illustrated in part (a) of FIG. 13, image Im2 projected on screen 200, object hm illuminated with illumination light Ln1 of external illumination light source 210, and image Im3 projected on object hm can be imaged together.

On the other hand, as illustrated in part (b) of FIG. 21, when ¼ wave plate 55 is removed from the optical path and ¼ wave plate 55 is not present on the optical path, P-polarized image light Lp1 emitted from image light emitter 45 is directly projected on screen 200. Image Im2 projected on screen 200 and image Im3 projected on object hm are P-polarized image light Lp1. Since image light Lp1 reflected by screen 200 and object hm passes through projection lens unit 61 and is also transmitted through optical path separation element 54, the image light does not travel to imaging element 75.

Thus, only S-polarized component Lns of reflected light Ln2 is reflected by polarization separation coating 54c of optical path separation element 54 and travels toward imaging element 75. As a result, P-polarized image light Lp1 projected and reflected on screen 200 is not imaged, and only S-polarized component Lns of reflected light Ln2 is imaged by imaging element 75.

Thus, when ¼ wave plate 55 is not present on the optical path, as illustrated in part (b) of FIG. 13, an image including only the illumination light and the ambient light reflected by screen 200 and object hm is imaged. As described above, since the image not affected by the projection light can be imaged, object hm is detected by using the image not including the projection light and is combined with a projected image, and thus, the mapping following object hm can be performed.

In accordance with projection imaging optical system 56C and projection display apparatus 11C according to the eleventh exemplary embodiment, ¼ wave plate 55 is insertable and removable to and from an optical path of image light incident on projection lens unit 61 from optical path separation element 54. As a result, image Im2 projected on screen 200, object hm illuminated with illumination light Ln1 of external illumination light source 210, and image Im3 projected on object hm can be imaged together, or the image including only the illumination light and the ambient light reflected by screen 200 and object hm can be imaged.

In addition, since illumination light and ambient light often have a small amount of light, as illustrated in part (b) of FIG. 13, in order to image an image except for the projected image, it is preferable that stray light generated from optical path separation element 54 and lenses 61a, 61b of projection lens unit 61 is reliably removed not to enter imaging element 75. Thus, since the configuration for removing the stray light according to the ninth and tenth exemplary embodiments is very effective, it is also very useful to combine the eleventh exemplary embodiment with the ninth and tenth exemplary embodiments.

At least a part of the projection target includes movable object hm, and projection display apparatus 11C includes image processor 93 that recognizes object hm in the image imaged by imaging element 75 by the image processing, and controller 95 that performs display control of the image light emitted from image light emitter 45 according to the movement of object hm to project the image light on object hm in the image.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. In addition, a new exemplary embodiment can be made by combining the components described in the above exemplary embodiments.

In each exemplary embodiment, when the image light of the S-polarized light and the image light of the P-polarized light are used, these polarization states may be exchanged. For example, the image light emitted from narrowband retarder plate 52 may be S-polarized light, and the image light incident on imaging element 75 may be P-polarized light.

In each exemplary embodiment, optical path separating prisms are used as optical path separation elements 53, 54, but the present disclosure is not limited thereto. Optical path separation elements 53, 54 may be mirrors in which partial reflection coatings 53c, 53Dc or polarization separation coating 54c is formed.

Figure 22:
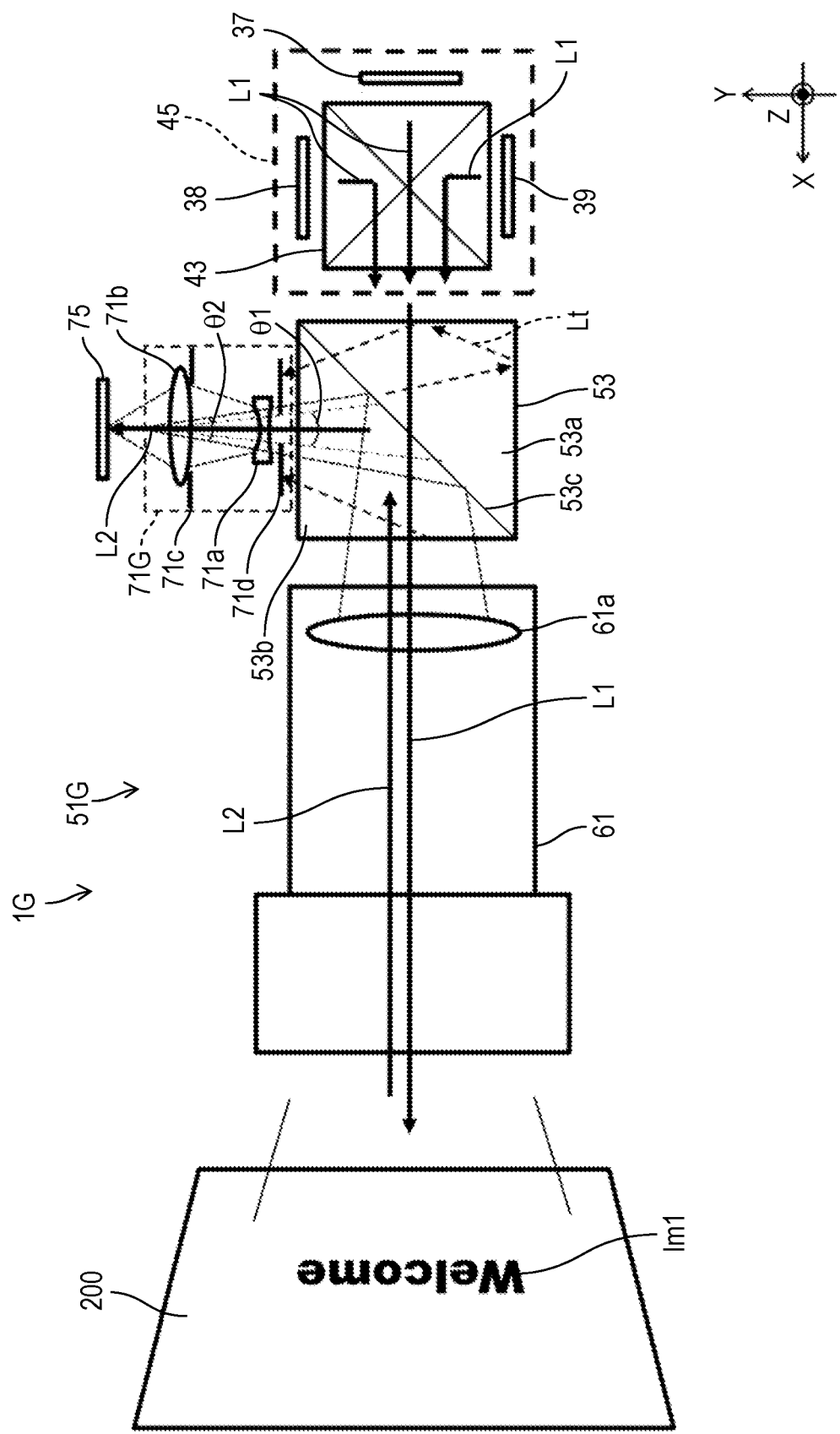
FIG. 22 is a diagram illustrating a configuration of a projection imaging optical system according to a modification of the first exemplary embodiment.

In FIG. 2 describing the first exemplary embodiment, capturing angle θ1 of external light L2 in condensing optical system 71 and condensing angle θ2 of the lens F-number of projection lens unit 61 are illustrated at the same angle, but the present disclosure is not limited thereto. For example, as illustrated in FIG. 22, capturing angle θ1 of external light L2 in condensing optical system 71 may be smaller than condensing angle θ2 of the lens F-number of projection lens unit 61. In projection imaging optical system 51G of projection display apparatus 1G according to the modification of the first exemplary embodiment in FIG. 22, condensing optical system 71G of projection imaging optical system 51G includes second light absorber 71d between concave lens 71a and second prism 53b, and second light absorber 71d sets capturing angle θ1 to be smaller than condensing angle θ2. Even with such a configuration, it is possible to further attenuate stray light Lt incident on condensing optical system 71G at an angle larger than capturing angle θ1.

In the eighth to eleventh exemplary embodiments, image light emitter 45D includes three liquid crystal display elements as the light modulation elements, but the present disclosure is not limited thereto. Image light emitter 45D may include a digital micromirror device (DMD) instead of the liquid crystal display element. Since the polarization of the image light emitted from the DMD is also aligned by narrowband retarder plate 52, the same effects as the effects of the exemplary embodiments can be obtained.

As described above, the exemplary embodiments have been described as examples of the techniques of the present disclosure. The attached drawings and the detailed descriptions have been presented for this purpose. Thus, not only components that are essential for solving the problem but also components that are not essential for solving the problem may also be included in the components described in the accompanying drawings and the detailed description in order to exemplify the above technique. Accordingly, when those non-essential components are described in the accompanying drawings and detailed description, the non-essential components should not be immediately acknowledged to be essential based on only the description.

In addition, because the above exemplary embodiments are for illustrating the techniques in the present disclosure, various modifications, replacements, additions, omissions, or the like can be made without departing from the scope of the accompanying claims or the equivalent thereof.

Outline of Exemplary Embodiment (1) A projection display apparatus according to a first aspect of the present disclosure includes an image light emitter that includes a light modulation element that emits image light obtained by modulating light from a light source device according to an image signal, a projection lens unit that enlarges and projects the image light on a projection target, and incidents external light including the image light reflected by the projection target, an optical path separation element that is disposed between the image light emitter and the projection lens unit, an imaging element that images the external light incident via the projection lens unit and the optical path separation element, and a condensing optical system that is disposed between the optical path separation element and the imaging element. The optical path separation element transmits a part of the image light emitted from the image light emitter to the projection lens unit, and reflects a part of the external light emitted from the projection lens unit to the condensing optical system. The condensing optical system condenses the part of the external light reflected by the optical path separation element on the imaging element, and a capturing angle of the external light in the condensing optical system is equal to or less than a condensing angle of a lens F-number of the projection lens unit.

As a result, even though the image light is reflected within the optical path separation element and the projection lens unit to generate the stray light, since the capturing angle of the external light in the condensing optical system is equal to or less than an emission angle at which the image light is emitted to the screen, the stray light incident on the condensing optical system at an angle larger than the capturing angle can be attenuated. Thus, the stray light incident on the imaging element can be reduced.

(2) In the projection display apparatus of (1), a first optical path length from the projection target to the light modulation element via the projection lens unit and the optical path separation element is different from a second optical path length from the projection target to the imaging element.

(3) In the projection display apparatus of (1) or (2), the condensing optical system includes a concave lens that diverges the external light which is incident on the concave lens, a convex lens that condenses the external light which is diverged by the concave lens on the imaging element, and a first light absorber that is disposed between the convex lens and the concave lens, and absorbs the external light diverged at a predetermined angle or more by the concave lens.

(4) The projection display apparatus of any one of (1) to (3) further includes a reflected light attenuator that attenuates at least a part of the image light reflected by the optical path separation element.

(5) In the projection display apparatus of (4), the reflected light attenuator includes a reflected light attenuation plate that is disposed on a side opposite to the imaging element with respect to the optical path separation element and is disposed to be inclined with respect to the optical path separation element, and a reflected light absorber that absorbs the image light reflected by the reflected light attenuation plate.

(6) In the projection display apparatus of any one of (1) to (5), the amount of light reflected by the optical path separation element is equal to or less than 10% of the amount of light incident on the optical path separation element.

(7) In the projection display apparatus of any one of (1) to (6), the condensing optical system includes a reduction optical system, the light modulation element and the imaging element are in a non-conjugate relationship with respect to the projection lens unit, and a size of the light modulation element and a size of the imaging element are different.

(8) In the projection display apparatus of any one of (1) to (7), the optical path separation element includes a plurality of prisms, and a partial reflection coating that is disposed on a bonding surface on which the plurality of prisms are bonded, reflects a part of each of the incident image light and the incident external light, and transmits remaining light.

(9) In the projection display apparatus of (8), the partial reflection coating is a polarization separation coating.

(10) In the projection display apparatus of (9), the image light emitter has a plurality of light modulation elements and a narrowband retarder plate that aligns polarization states of image light rays emitted from the plurality of light modulation elements.

(11) In the projection display apparatus of (9) or (10), the image light emitter emits image light in a first polarization state of one of P-polarized light and S-polarized light, and the polarization separation coating transmits the image light in the first polarization state incident from the image light emitter, and reflects light in a second polarization state of the other of the P-polarized light and the S-polarized light. The projection display apparatus further includes a ¼ wave plate that is disposed between the optical path separation element and the projection lens unit, converts the image light in the first polarization state into circularly polarized image light, and converts the circularly polarized image light reflected by the projection target into image light in the second polarization state, and a polarizing plate that is disposed between the optical path separation element and the imaging element, and transmits external light in the second polarization state.

(12) In the projection display apparatus of (11), the polarizing plate is rotatable.

(13) In the projection display apparatus of (11) or (12), the ¼ wave plate is insertable and removable to and from an optical path of the image light incident on the projection lens unit from the optical path separation element.

(14) The projection display apparatus of (13) further includes a driver that inserts and removes the ¼ wave plate to and from the optical path of the image light incident on the projection lens unit from the optical path separation element.

(15) In the projection display apparatus of (13) or (14), the projection target includes a movable object, and the projection display apparatus includes an image processor that recognizes the movable object in an image imaged by the imaging element by image processing, and a controller that controls the image signal transmitted to the light modulation element according to a movement of the movable object to project the image light on the movable object in the image.

(16) A projection display apparatus according to a second aspect of the present disclosure includes an image light emitter that emits image light in a first polarization state of one of P-polarized light and S-polarized light, an optical path separation prism as an optical path separation element including a polarization separation coating that transmits the image light in the first polarization state incident from the image light emitter, and reflects light in a second polarization state of the other of the P-polarized light and the S-polarized light, a projection lens unit that enlarges and projects the image light transmitted through the optical path separation element on a projection target, and incidents external light including the image light reflected on the projection target, a ¼ wave plate that is disposed between the optical path separation element and the projection lens unit, converts the image light in the first polarization state into circularly polarized image light, and converts the circularly polarized image light reflected by the projection target into image light in the second polarized state, an imaging element that images the external light incident via the projection lens unit and the optical path separation element, and a polarizing plate that is disposed between the optical path separation element and the imaging element, and transmits the external light in the second polarization state.

As a result, since the polarized light of the image light emitted from the optical path separation element toward the projection target and the polarized light of the image light as the external light reflected by the projection target and incident on the optical path separation element are in different polarization states of the P-polarized light and the S-polarized light, only the light in the polarization state of the image light reflected by the projection target can be incident on the imaging element by the polarizing plate. Thus, even though the image light incident from the image light emitter is reflected by the optical path separation element to become the stray light and travels toward the imaging element, the image light can be blocked by the polarizing plate. Since the external light is also incident on the imaging element only by the light component having the same state as the polarization state of the image light reflected by the projection target, it is possible to reduce imaging of the external light other than the image light reflected by the projection target.

(17) In the projection display apparatus of (16), the polarizing plate is rotatable.

(18) The projection display apparatus of (16) or (17) includes a reflected light attenuator that is disposed on a side opposite to the imaging element with respect to the optical path separation prism, and attenuates the image light reflected within the optical path separation prism.

(19) In the projection display apparatus of any one of (16) to (18), the reflected light attenuator includes a reflected light attenuation plate that is disposed to be inclined with respect to the optical path separation prism, and a reflected light absorber that absorbs the image light reflected by the reflected light attenuation plate.

(20) The projection display apparatus of any one of (16) to (19) further includes a diaphragm that is disposed between the optical path separation prism and the polarizing plate.

(21) In the projection display apparatus of any one of (16) to (20), the ¼ wave plate is insertable and removable to and from an optical path of the image light incident on the projection lens unit from the optical path separation prism.

(22) The projection display apparatus of (21) further includes a driver that inserts and removes the ¼ wave plate to and from the optical path of the image light incident on the projection lens unit from the optical path separation prism.

(23) In the projection display apparatus of (21) to (22), the projection target includes a movable object, and the projection display apparatus includes an image processor that recognizes the movable object in an image imaged by the imaging element by image processing, and a controller that performs display control of the image light emitted from the image light emitter according to a movement of the movable object to project the image light on the movable object in the image.

The present disclosure is applicable to a projection display apparatus that projects an image.

What is claimed is:

1. A projection display apparatus, comprising:
   an image light emitter that includes at least one light modulation element that emits image light obtained by modulating light from a light source device according to an image signal;

a projection lens unit that enlarges and projects the image light on a projection target, and incidents external light including the image light reflected by the projection target;
an optical path separation element that is disposed between the image light emitter and the projection lens unit;
an imaging element that images the external light incident via the projection lens unit and the optical path separation element; and
a condensing optical system that is disposed between the optical path separation element and the imaging element, wherein
the optical path separation element transmits a part of the image light emitted from the image light emitter to the projection lens unit, and reflects a part of the external light emitted from the projection lens unit to the condensing optical system,
the condensing optical system condenses the part of the external light reflected by the optical path separation element on the imaging element, and
a capturing angle of the external light in the condensing optical system is equal to or less than a condensing angle of a lens F-number of the projection lens unit.

2. The projection display apparatus according to claim 1, wherein a first optical path length from the projection target to the at least one light modulation element via the projection lens unit and the optical path separation element is different from a second optical path length from the projection target to the imaging element.

3. The projection display apparatus according to claim 1, wherein
the condensing optical system includes
a concave lens that diverges the external light which is incident on the concave lens,
a convex lens that condenses the external light which is diverged by the concave lens on the imaging element, and
a first light absorber that is disposed between the convex lens and the concave lens, and absorbs the external light diverged at a predetermined angle or more by the concave lens.

4. The projection display apparatus according to claim 1, further comprising a reflected light attenuator that attenuates at least a part of the image light reflected by the optical path separation element.

5. The projection display apparatus according to claim 4, wherein
the reflected light attenuator includes
a reflected light attenuation plate that is disposed on a side opposite to the imaging element with respect to the optical path separation element and is disposed to be inclined with respect to the optical path separation element, and
a reflected light absorber that absorbs the image light reflected by the reflected light attenuation plate.

6. The projection display apparatus according to claim 1, wherein an amount of light reflected by the optical path separation element is equal to or less than 10% of an amount of light incident on the optical path separation element.

7. The projection display apparatus according to claim 1, wherein
the condensing optical system includes a reduction optical system,
the at least one light modulation element and the imaging element are in a non-conjugate relationship with respect to the projection lens unit, and
a size of the at least one light modulation element and a size of the imaging element are different.

8. The projection display apparatus according to claim 1, wherein
the optical path separation element includes
a plurality of prisms, and
a partial reflection coating that is disposed on a bonding surface on which the plurality of prisms are bonded, reflects a part of each of the incident image light and the incident external light, and transmits remaining light.

9. The projection display apparatus according to claim 8, wherein the partial reflection coating is a polarization separation coating.

10. The projection display apparatus according to claim 9, wherein
the at least one light modulation element is a plurality of light modulation elements, and
the image light emitter has a narrowband retarder plate that aligns polarization states of image light rays emitted from the plurality of light modulation elements.

11. The projection display apparatus according to claim 9, further comprising:
a ¼ wave plate that is disposed between the optical path separation element and the projection lens unit, converts image light in a first polarization state of one of P-polarized light and S-polarized light into circularly polarized image light, and converts the circularly polarized image light reflected by the projection target into image light in a second polarization state of the other of the P-polarized light and the S-polarized light; and
a polarizing plate that is disposed between the optical path separation element and the imaging element, and transmits external light in the second polarization state,
wherein
the image light emitter emits the image light in the first polarization state, and
the polarization separation coating transmits the image light in the first polarization state incident from the image light emitter, and reflects the light in the second polarization state.

12. The projection display apparatus according to claim 11, wherein the polarizing plate is rotatable.

13. The projection display apparatus according to claim 11, wherein the ¼ wave plate is insertable and removable to and from an optical path of the image light incident on the projection lens unit from the optical path separation element.

14. The projection display apparatus according to claim 13, further comprising a driver that inserts and removes the ¼ wave plate to and from the optical path of the image light incident on the projection lens unit from the optical path separation element.

15. The projection display apparatus according to claim 13, wherein
the projection target includes an object that are movable, and
the projection display apparatus comprises:
an image processor that recognizes the object in an image imaged by the imaging element by image processing; and
a controller that controls the image signal transmitted to the at least one light modulation element according to a movement of the object to project the image light on the object in the image.

16. A projection display apparatus, comprising:
an image light emitter that emits image light in a first polarization state of one of P-polarized light and S-polarized light;
an optical path separation element including a polarization separation coating that transmits the image light in the first polarization state incident from the image light emitter, and reflects light in a second polarization state of the other of the P-polarized light and the S-polarized light;
a projection lens unit that enlarges and projects the image light transmitted through the optical path separation element on a projection target, and incidents external light including the image light reflected on the projection target;
a ¼ wave plate that is disposed between the optical path separation element and the projection lens unit, converts the image light in the first polarization state into circularly polarized image light, and converts the circularly polarized image light reflected by the projection target into image light in the second polarized state;
an imaging element that images the external light incident via the projection lens unit and the optical path separation element;
a polarizing plate that is disposed between the optical path separation element and the imaging element, and transmits the external light in the second polarization state; and
a reflected light attenuator that is disposed on a side opposite to the imaging element with respect to the optical path separation element, and attenuates the image light reflected within the optical path separation element.

17. The projection display apparatus according to claim 16, wherein the polarizing plate is rotatable.

18. The projection display apparatus according to claim 16, wherein
the reflected light attenuator includes
a reflected light attenuation plate that is disposed to be inclined with respect to the optical path separation element, and
a reflected light absorber that absorbs the image light reflected by the reflected light attenuation plate.

19. The projection display apparatus according to claim 16, further comprising a diaphragm that is disposed between the optical path separation element and the polarizing plate.

20. The projection display apparatus according to claim 16, wherein the ¼ wave plate is insertable and removable to and from an optical path of the image light incident on the projection lens unit from the optical path separation element.

21. The projection display apparatus according to claim 20, further comprising a driver that inserts and removes the ¼ wave plate to and from the optical path of the image light incident on the projection lens unit from the optical path separation element.

22. The projection display apparatus according to claim 20, wherein
the projection target includes an object that are movable, and
the projection display apparatus comprises:
an image processor that recognizes the object in an image imaged by the imaging element by image processing; and
a controller that performs display control of the image light emitted from the image light emitter according to a movement of the object to project the image light on the object in the image.

* * * * *